United States Patent
Owen et al.

(10) Patent No.: US 6,414,996 B1
(45) Date of Patent: Jul. 2, 2002

(54) SYSTEM, METHOD AND APPARATUS FOR AN INSTRUCTION DRIVEN DIGITAL VIDEO PROCESSOR

(75) Inventors: Jefferson Eugene Owen, Fremont; Darryn McDade, Santa Clara, both of CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/207,343

(22) Filed: Dec. 8, 1998

(51) Int. Cl.$^7$ .................................................. H04N 7/12
(52) U.S. Cl. ........................... 375/240.17; 375/240.16; 375/240.25; 348/699
(58) Field of Search ........................ 375/240.16, 240.17, 375/240.25, 240.26; 348/402.1, 407.1, 413.1, 416.1, 699–700; 382/236

(56) References Cited

U.S. PATENT DOCUMENTS

| | | | |
|---|---|---|---|
| 5,329,318 A | * 7/1994 | Keith | 348/699 |
| 5,363,139 A | * 11/1994 | Keith | 348/415 |
| 5,386,233 A | * 1/1995 | Keith | 348/407.1 |
| 5,774,206 A | 6/1998 | Wasserman et al. | 395/200.77 |
| 5,781,664 A | 7/1998 | Bheda et al. | 382/233 |
| 5,903,312 A | * 5/1999 | Malladi et al. | 348/405 |
| 5,920,353 A | * 7/1999 | Diaz et al. | 348/402 |
| 5,990,958 A | 11/1999 | Bheda et al. | 348/407 |
| 6,028,635 A | * 2/2000 | Owen et al. | 348/403 |
| 6,173,366 B1 | 1/2001 | Thayer et al. | 711/129 |
| 6,212,330 B1 | 4/2001 | Yamamoto et al. | 386/95 |

FOREIGN PATENT DOCUMENTS

| | | | |
|---|---|---|---|
| EP | 0 572 263 A2 | 12/1993 | .......... H04N/7/133 |
| EP | 0 572 766 A2 | 12/1993 | .......... G06F/15/66 |
| EP | 0673171 A | 9/1995 | |
| EP | 0 673 171 A2 | 9/1995 | ............ H04N/7/50 |
| EP | 0 710 027 A2 | 5/1996 | ............ H04N/7/24 |
| EP | 0772159 A | 5/1997 | |
| EP | 0789495 A | 8/1997 | |
| EP | 0 827 110 A2 | 3/1998 | ............ G06T/9/00 |
| EP | 0847203 A | 6/1998 | |
| EP | 0847204 A | 6/1998 | |
| EP | 0863462 A | 9/1998 | |

* cited by examiner

*Primary Examiner*—Vu Le
(74) *Attorney, Agent, or Firm*—Lisa K. Jorgenson; William A. Munck

(57) ABSTRACT

The present invention provides a system, method and an apparatus for a digital video processor comprising an error memory and a merge memory, a half pixel filter communicably coupled to the merge memory, a controller communicably coupled to the error memory, the merge memory and the half pixel filter. The present invention also including a sum unit communicably coupled to the error memory. The controller executing one or more instructions to provide motion compensation during video decoding.

15 Claims, 17 Drawing Sheets

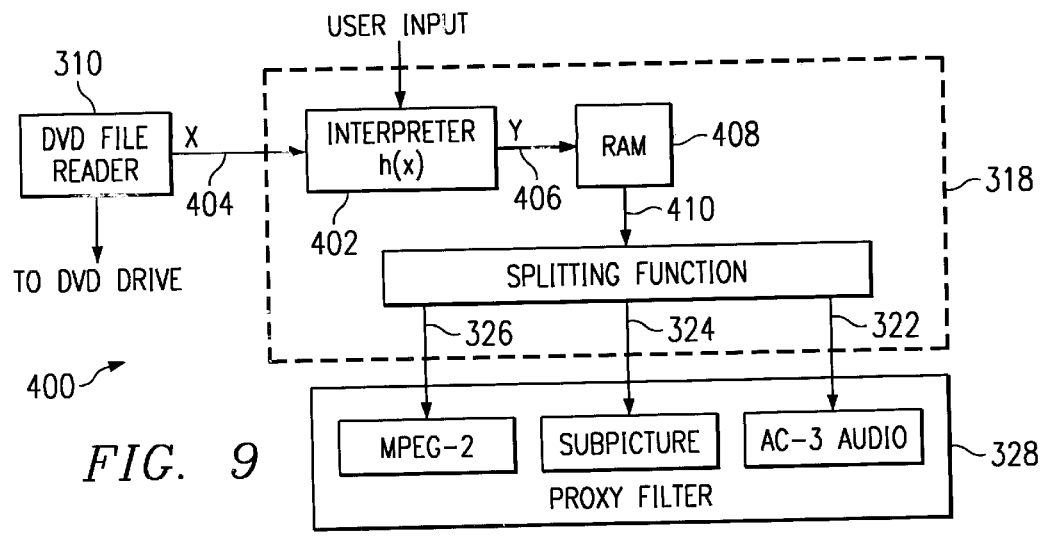

| |
|---|
| LOAD INSTRUCTIONS FOR 1st Y PREDICTION BLOCK IN MACROBLOCK |
| MERGE INSTRUCTIONS FOR 2nd Y PREDICTION BLOCK IN MACROBLOCK |
| ⋮ |
| MERGE INSTRUCTIONS FOR LAST Y PREDICTION BLOCK IN MACROBLOCK |
| WRITE INSTRUCTIONS FOR PREDICTED Y MACROBLOCK |
| LOAD INSTRUCTIONS FOR 1st CR PREDICTION BLOCK IN MACROBLOCK |
| MERGE INSTRUCTIONS FOR 2nd CR PREDICTION BLOCK IN MACROBLOCK |
| ⋮ |
| MERGE INSTRUCTIONS FOR LAST CR PREDICTION BLOCK IN MACROBLOCK |
| WRITE INSTRUCTIONS FOR PREDICTED CR MACROBLOCK |
| LOAD INSTRUCTIONS FOR 1st CB PREDICTION BLOCK IN MACROBLOCK |
| MERGE INSTRUCTIONS FOR 2nd CB PREDICTION BLOCK IN MACROBLOCK |
| ⋮ |
| MERGE INSTRUCTIONS FOR LAST CB PREDICTION BLOCK IN MACROBLOCK |
| WRITE INSTRUCTIONS FOR PREDICTED CB MACROBLOCK |
| ⋮ |

FIG. 13

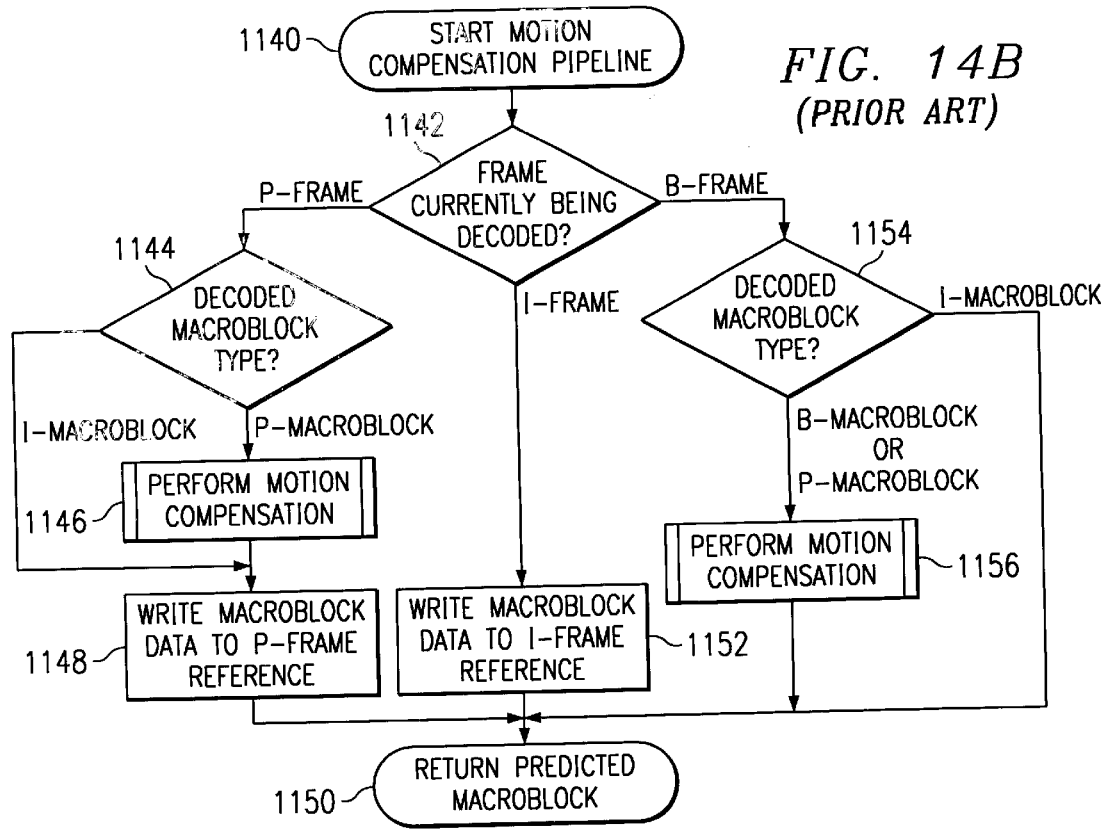
FIG. 14B
(PRIOR ART)
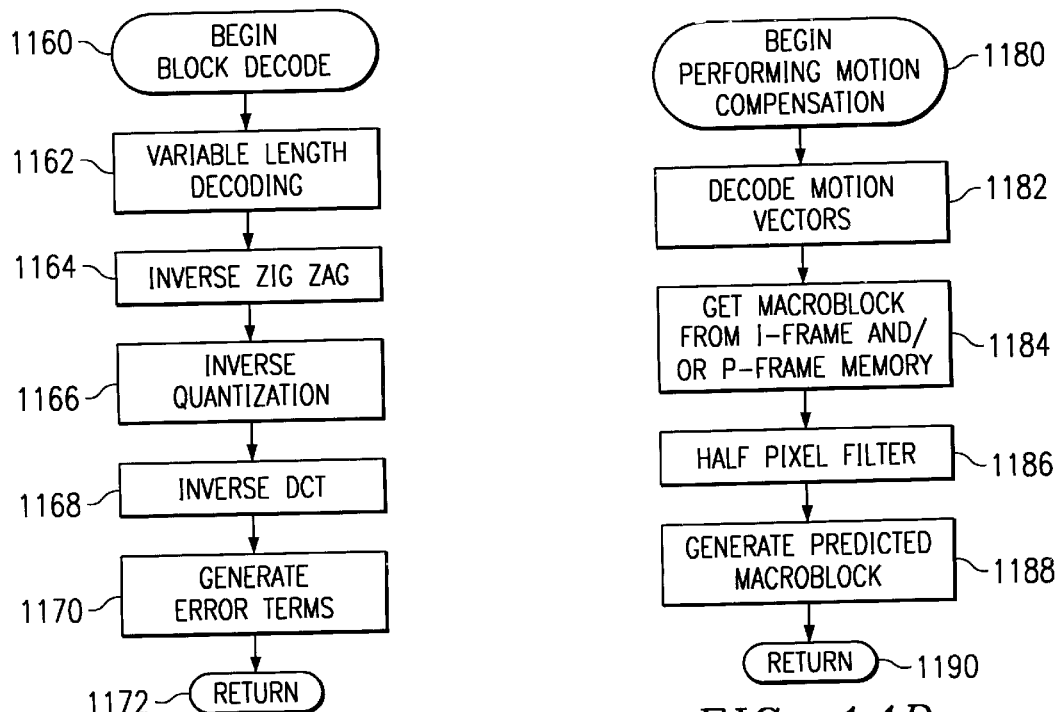
FIG. 14C
(PRIOR ART)
FIG. 14D
(PRIOR ART)

SYSTEM, METHOD AND APPARATUS FOR AN INSTRUCTION DRIVEN DIGITAL VIDEO PROCESSOR

FIELD OF THE INVENTION

The present invention relates in general to the field of digital video decoding devices, and more particularly, to a system, method and apparatus for an instruction driven digital video processor to provide motion compensation during video decoding.

BACKGROUND

The storage and/or transmission of digital audio-visual data, which typically includes not only video data and audio data, but also other data for menus, sub-pictures, graphics, control/navigation, etc., is made possible through the use of compression or encoding techniques. For example, the amount of data required to represent the video images and audio signal of a movie in an uncompressed digital format would be enormous and could not fit entirely onto a conventional recording medium, such as a compact disk ("CD"). Similarly, transmitting a movie in uncompressed digital form over a communication link (for real-time video) would be prohibitively expensive due to the large quantity of data to be transmitted and the large bandwidth required to transmit the data.

The video compression techniques typically used for storing audio-visual data on a digital video disc ("DVD"), which can hold up to 18 gigabytes of data, have been formulated by the International Standard Organization's ("ISO") Motion Picture Experts Group ("MPEG"). The MPEG standards use a discrete cosine transform ("DCT") algorithm to encode, or compress, the large amount of audio-visual digital data into a much smaller amount of audio-visual digital data that can be stored on a conventional recording medium. In general terms, this is accomplished by eliminating any repetitive video data, reducing the video data needed to depict movement, and eliminating any audio data that is not discernable by the human ear.

MPEG-1, which is defined in ISO/IEC 11172 and is hereby incorporated by reference, sets forth a standard format for storing and distributing motion video and audio. This standard has been used as a basis for video CDs and video games. MPEG-1 was designed for the playback of digital audio and video at a bit rate of 1.416 megabits per second ("Mbps") (1.15 Mbps is designated for video) from data stored on a standard CD.

MPEG-2, which is defined in ISO/IEC 13818 and is hereby incorporated by reference, enhances or expands MPEG-1 to cover a wider range of applications. MPEG-2 was originally designed for the transmission of all-digital broadcast-quality video and audio at bit rates between 4 and 9 Mbps. MPEG-2, however, has become useful for may other applications, such as high definition television, and supports applications having bit rates between 1.5 and 60 Mbps.

Although the MPEG standards are typically used only for one-way communication, the H.261 and H.263 standards, which are also based on the DCT algorithm, are typically used for two-way communication, such as video telephony.

Video and/or audio compression devices, typically referred to as encoders, are used to encode a video and/or audio sequence before the sequence is transmitted or stored. The resulting encoded bitstream may then be decoded by a video and/or audio decompression device, typically referred to as a decoder, before the video and/or audio sequence is output. An encoded bitstream can only be decoded by a decoder if the encoded bitstream complies with the standard used by the decoder. Therefore, to facilitate compatibility for products produced among several manufacturers in the consumer electronics industry, the MPEG standards are being utilized for the digital video and audio decompression.

In simple terms, the DVD stores video images to be retrieved and displayed on a video display, as well as audio data to be retrieved and heard. A DVD player reads the audio-visual data stored on the DVD, decompresses and decodes the data, and generates video and audio signals for output to a video display system and audio system (i.e., to be played). In addition, DVD players typically include the capability to read, decompress and decode audio data using a variety of audio decompression techniques, such as MPEG-1, MPEG-2, PCM, Dolby AC-3 (commonly referred to as Dolby Digital), etc. Accordingly, DVD players are well-suited for playing audio-visual works, such as movies, video games, etc.

Generally, the video and audio signals are output from a DVD player to a video display (e.g. television) and a sound system (e.g. stereo system). In other words, when playing an audio-visual work, such as a movie, the DVD player reads an audio-visual stream of data from the DVD and displays the video portion of the stream (including a sub-picture portion) on the video display (television) and plays the audio portion of the stream on one or more audio speakers (stereo system).

Once the audio-visual data has been read, decompressed and decoded, the audio data must be synchronized with the video data. To facilitate the synchronized playing of the video and audio portions of the audio-visual data stream, the data stream is stored on the DVD using time stamps from a referenced frequency. The referenced frequency is defined as an integer multiple of a 27 megahertz ("MHZ") clock. The time stamps indicate when a particular portion of the data stream is to be played, and are also used to synchronize the display of the video portion with the playing of the audio portion. As a result, the DVD player requires an integer multiple of a 27 MHZ clock to ensure that portions of the data stream are played at the appropriate time and that both the video portion and audio portion of the data stream are synchronized.

SUMMARY OF THE INVENTION

The present invention can provide a digital video processor comprising an error memory and a merge memory, a half pixel filter communicably coupled to the merge memory, a controller communicably coupled to the error memory, the merge memory and the half pixel filter. The present invention also including a sum unit communicably coupled to the error memory. The controller executing one or more instructions to provide motion compensation during video decoding.

The present invention can also provide a digital video processor comprising an error memory configured to store one or more error terms, a merge memory configured to store one or more filtered prediction blocks and a filter communicably coupled to the merge memory. The filter is configured to perform vertical and horizontal half-pixel interpolation on a block as dictated by a motion vector. In addition, an instruction queue configured to store one or more instructions, an execution unit communicably coupled to the instruction queue and the error memory. The execution unit is configured to receive an instruction from the instruction queue, determine whether the error memory is full and send the instruction to a motion compensation state machine for execution. The motion compensation state machine communicably coupled to the execution unit, the filter and the merge memory, the motion compensation state machine configured to execute the instruction received from the execution unit. A sum unit is communicably coupled to the error memory and the merge memory, the sum unit utilizes at least one or more error terms stored in the error memory with one or more filtered prediction blocks stored in the merge memory to produce a decoded macroblock.

In addition, the present invention provides a digital video processor comprising an error buffer, an error memory communicably coupled to the error buffer, the error memory configured to receive and store one or more error terms from the error buffer, an instruction buffer, and an instruction queue communicably coupled to the instruction buffer. The instruction queue configured to receive and store one or more instructions from the instruction buffer and a merge memory is configured to receive and store one or more filtered prediction blocks. Also included are a reference buffer, a half pixel filter communicably coupled to the reference buffer and the merge memory. The half pixel filter performs vertical and horizontal half-pixel interpolation on a prediction block received from the reference buffer as dictated by a motion vector to produce a filtered prediction block, and writing the filtered prediction block to the merge memory. An execution unit is communicably coupled to the instruction queue and the error memory, and the execution unit configured to receive an instruction from the instruction queue, determine whether the error memory is full and send the instruction to a motion compensation state machine for execution. The motion compensation state machine is communicably coupled to the execution unit, the half pixel filter and the merge memory, the motion compensation state machine configured to execute the instruction received from the execution unit. A sum unit communicably coupled to the error memory and the merge memory, the sum unit utilizing at least one or more error terms stored in the error memory and one or more filtered prediction blocks stored in the merge memory to produce a decoded macroblock, and to write the decoded macroblock to an display buffer.

The present invention can also provide a method for providing video motion compensation comprising the steps of receiving one or more prediction blocks, receiving one or more instructions, receiving one or more error terms, and utilizing at least the one or more prediction blocks and the one or more error terms as directed by the one or more instructions to produce a decoded macroblock.

In addition, the present invention provides a method for providing video motion compensation comprising the steps of receiving an instruction and writing the instruction to an instruction queue, moving the instruction from the instruction queue to an execution unit if the execution unit is not full, receiving an error term and writing the error term to an error memory, executing the instruction in the execution unit if the instruction is not a write instruction. If the instruction in the execution unit is a write instruction, waiting until the error memory is full, and then utilizing at least all the error terms stored in the error memory and one or more prediction blocks stored in a merge memory to produce a decoded macroblock.

The present invention can also provide a system for providing video motion compensation comprising a video decoder configured to produce one or more instructions and one or more error terms, a picture memory, and a digital video processor comprising an error memory communicably coupled to the video decoder, a half pixel filter communicably coupled to the picture memory, a merge memory communicably coupled to the half pixel filter, a controller communicably coupled to the video decoder, the error memory, the merge memory and the half pixel filter, a sum unit communicably coupled to the error memory, the merge memory and the picture memory, and the controller executing the one or more instructions to provide motion compensation.

This implementation allows the motion compensation pipeline to be specified and implemented either separately or together with the block decode section with minimal coordination. The calculation of memory addresses and generation of pipeline control information may proceed in parallel with the data manipulation. In addition, the parsing and data filtering functions are decoupled from the motion compensation functions. And finally, the motion compensation pipeline may be fabricated in hardware while the parsing and motion compensation calculations are implemented in software.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 9 is a depiction of a DVD splitter and navigator in an embodiment of the overall invention;

FIG. 12 depicts the instruction sequence for a prediction block in memory;

FIG. 13 is a representation of an instruction structure for a prediction block;

FIGS. 14A, 14B, 14C and 14D are flowcharts depicting the steps of a video decoder in accordance with the prior art;

DETAILED DESCRIPTION OF THE INVENTION

The present invention is related to the following U.S. Patent Applications that are owned by STMicroelectronics, Inc. and which are hereby incorporated by reference: "Method and Apparatus for a Motion Compensation Generator" (ST File No. 97-S-153); "System, Method and Apparatus for a Variable Output Video Decoder" (ST File No. 97-S-155); and "System and Apparatus for a Digital Audio/Video Decoder" (ST File No. 97-S-159). While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
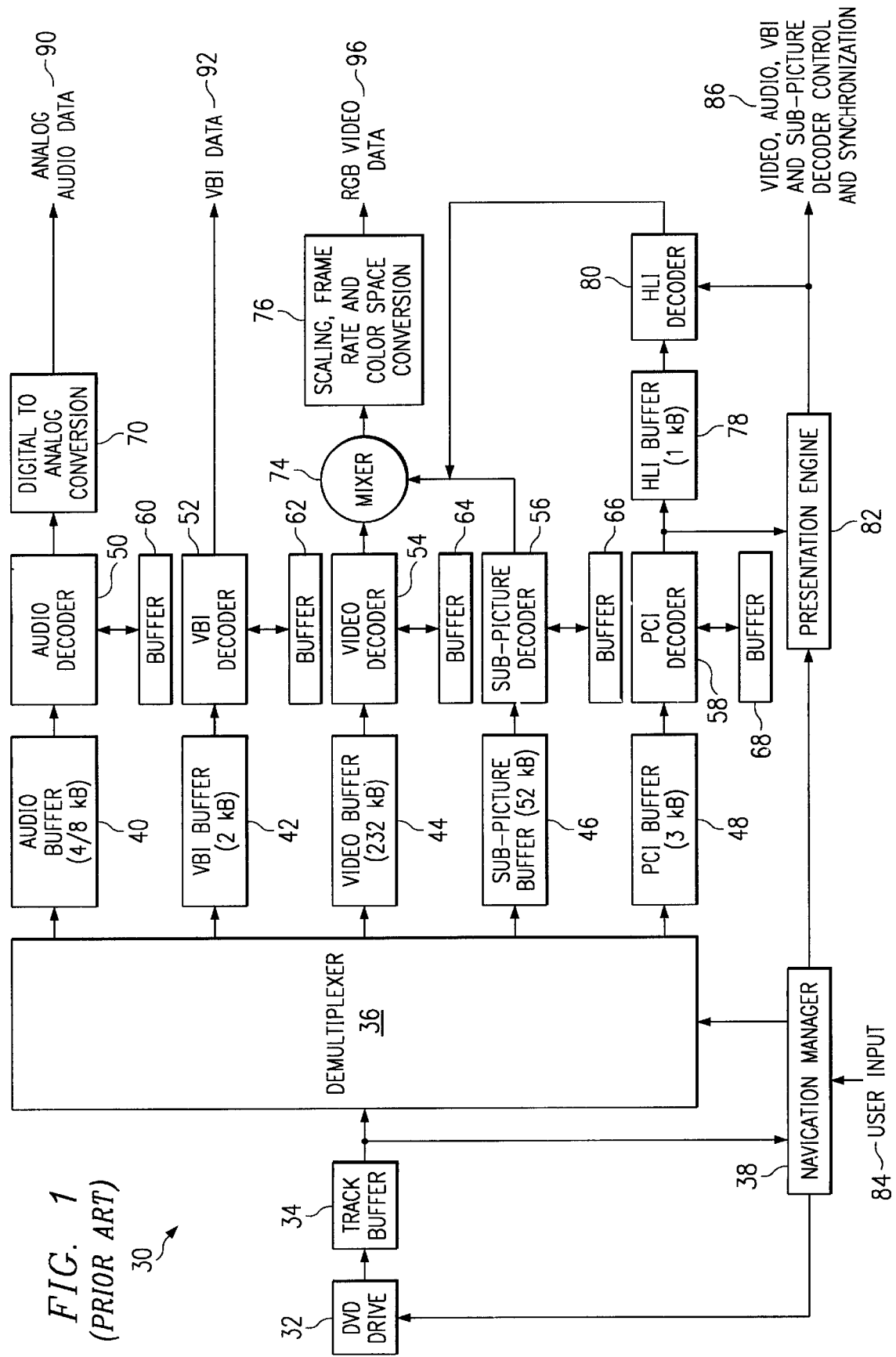
FIG. 1 is a functional block diagram depicting a typical digital video disc ("DVD") system.

Now referring to FIG. 1, a functional block diagram of a typical digital video disc ("DVD") system is illustrated and generally denoted by the numeral 30. The DVD system 30 includes a DVD drive 32 for reading tracks of data stored on a DVD (not shown) and converting the stored data into a bitstream, which may be in compressed or partially-compressed form. The data stored on the DVD generally includes video data, audio data, control and navigation data, and other data, such as data for menus, sub-pictures, graphics, presentation control information, highlight information, etc.

The bitstream is then input to a track buffer 34 (i.e. memory), which outputs the bitstream to a demultiplexer 36 and a navigation manager 38. The demultiplexer 36 divides the bitstream into a number of divided data portions, one for each type of data within the bitstream. The DVD system 30 illustrated in FIG. 1 divides the bitstream into five divided data portions: digital audio data, digital vertical blanking interval ("VBI") data, digital video data, digital sub-picture data, and digital presentation control information ("PCI") data. The demultiplexer 36 outputs each of these divided data portions to their respective buffers: an audio buffer 40 capable of storing 4 kilobytes ("kB") of Dolby Digital data or 8 kB of MPEG data; a VBI buffer 42 capable of storing 2 kB of data; a video buffer 44 capable of storing 232 kB of data; a sub-picture buffer 46 capable of storing 52 kB of data; and a PCI buffer 48 capable of storing 3 kB of data.

The digital audio data that is divided out from the bitstream and stored in the audio buffer 40 may be encoded in a number of ways, such as MPEG-1, MPEG-2, PCM, AC-3, etc., and may include digital audio data for one or more audio channels, such as mono, stereo, five channel-surround sound, etc. The digital audio data stored in the audio buffer 40 is decoded by an audio decoder 50 using the appropriate decoding process to recover the original audio data and a memory buffer 60 (typically RAM). The decoded digital audio data is then converted to analog form using a digital-to-analog ("D/A") converter 70. The analog audio data 90 is output to a sound system (not shown) for presentation to the user.

The digital VBI data that is divided out from the bitstream and stored in the VBI buffer 42 may be encoded in a number of ways, such as MPEG-1, MPEG-2, etc. The digital VBI data stored in the VBI buffer 42 is decoded by a VBI decoder 52 using the appropriate decoding process to recover the original VBI data and a memory buffer 62 (typically RAM). VBI data includes data that has been inserted during the vertical blanking interval between video frames. The insertion of decoded VBI data 92 is optional and may be used to provide additional functionality for the DVD system 30.

The digital video data that is divided out from the bitstream and stored in the video buffer 44 may be encoded in a number of ways, such as MPEG-1, MPEG-2, etc. The digital video data stored in the video buffer 44 is decoded by a video decoder 54 using the appropriate decoding process to recover the original video data (i.e. video frames) and a memory buffer 64 (typically RAM). The decoded digital video data is then input to a mixer 74 for mixing with decoded digital sub-picture data from a sub-picture decoder 56. The combined digital video data output from the mixer 74 is scaled, frame rate adjusted and color space converted by a converter 76 into the red-green-blue ("RGB") color video format, which may be either in digital or analog form (MPEG-2 uses the YCbCr color space, supporting 4:2:0, 4:2:2, and 4:4:4 sampling). A color space is a theoretical model describing how to separate color into different components. If RGB video data 94 is in digital form, another processing step of converting the digital RGB video data into analog RGB video data may be necessary (not shown) depending on the type of video display (analog or digital). The analog RGB video is then input to a video display, such as a computer monitor or a television (not shown).

The digital sub-picture data that is divided out from the bitstream and stored in the sub-picture buffer 46 may be encoded in a number of ways, such as MPEG-1, MPEG-2, etc. The digital sub-picture data stored in the sub-picture buffer 46 is decoded by a sub-picture decoder 56 using the appropriate decoding process to recover the original sub-picture data and a memory buffer 66 (typically RAM). Sub-picture data includes data representing a secondary video element that is desired to be combined with the primary video (output from the video decoder 54). Examples of a sub-picture include picture-in-picture ("PIP"), on-screen text and menus, close captioning, or any other type of video element added to, combined with, or overlaid on, the primary video. As previously described, the decoded digital sub-picture data is input to the mixer 74 for mixing with the decoded digital video data from the video decoder 54.

The digital PCI data that is divided out from the bitstream and stored in the PCI buffer 48 may be encoded in a number of ways, such as MPEG-1, MPEG-2, etc. The digital PCI data stored in the PCI buffer 48 is decoded by a PCI decoder 58 using the appropriate decoding process to recover the original PCI data and a memory buffer 68 (typically RAM). The decoded digital PCI data is input to a highlight information ("HLI") buffer 78 capable of storing 1 kB of data. The HLI buffer 78 outputs the decoded digital PCI data to a HLI decoder 80 for highlight information decoding. The decoded digital HLI data is mixed or combined with the digital sub-picture data (output from the sub-picture decoder 56) and functions to perform on-screen highlighting. The decoded digital PCI data is also input to a presentation engine 82, which controls and synchronizes the audio decoder 50, the VBI decoder 52, the video decoder 54, the sub-picture decoder 56 and the HLI decoder 80.

The DVD system 30 further includes a navigation manager 38 (including a processor, not shown) that controls the playing of the program(s) stored on the DVD (and retrieval of stored information). A user inputs commands to the navigation manager 38 via inputs 84 (e.g. buttons, remote control, etc.). Examples of such commands include forward, fast forward, reverse, rewind, play, pause, frame freeze, program selection, and the like. These commands drive the DVD drive 32 and/or the presentation engine 82 to perform the requested functions. The presentation engine 82 generates video, audio, VBI and sub-picture decoder control and synchronization signals 86.

Figures 2, 3:
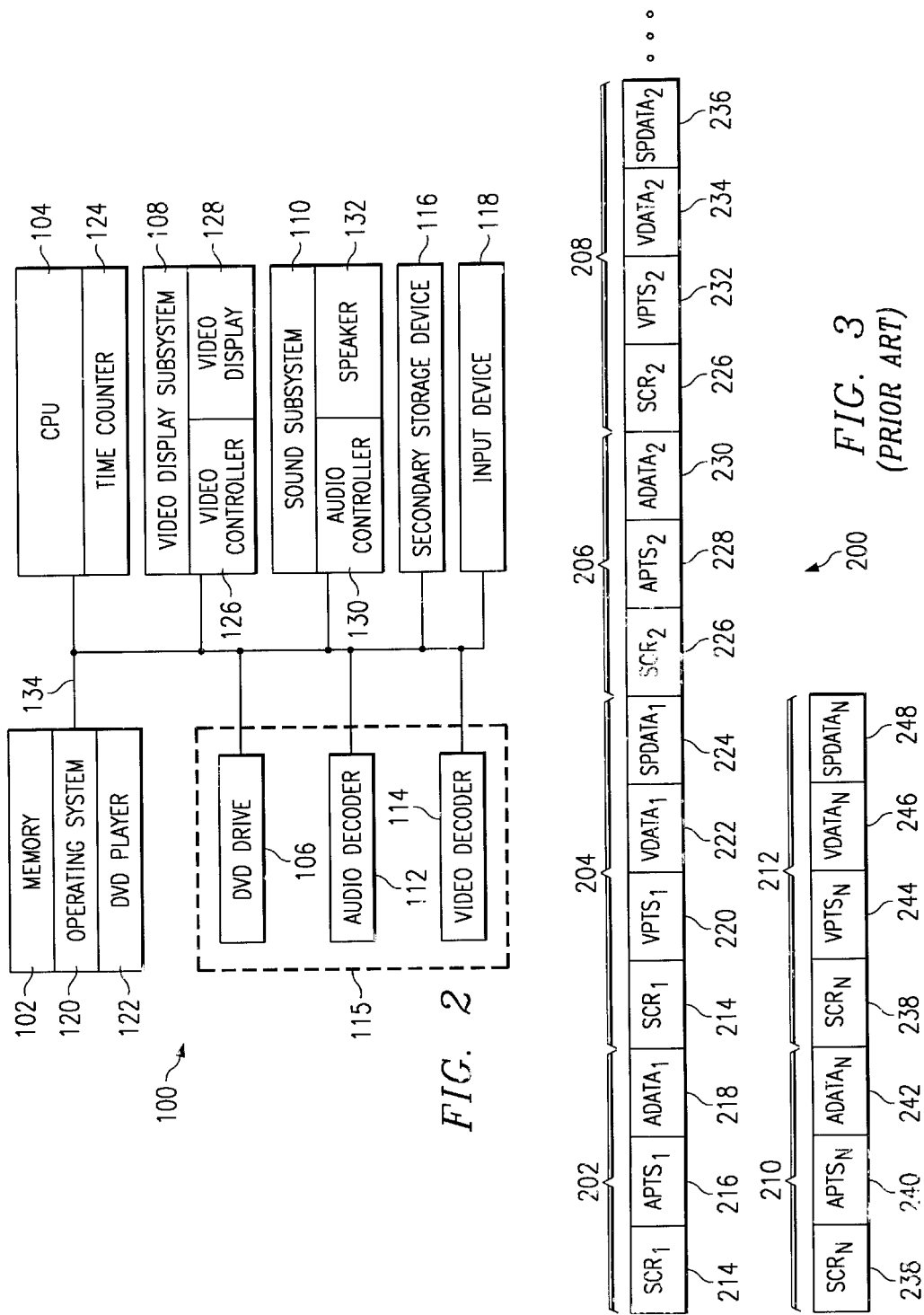
FIG. 2 is a block diagram of a computer and one embodiment of the present invention.
FIG. 3 is a depiction of the components contained in a coded audio-video data stream.

FIG. 2 depicts a computer system 100 that is suitable for practicing one of the preferred embodiments of the present invention. The computer system 100 contains a memory 102; a central processing unit ("CPU") 104 having a time counter 124, such as the PENTIUM II processor with MMX technology manufactured by Intel; a DVD drive 106; a video display subsystem 108, having a video controller 126 and a video display 128; a sound subsystem 110 having an audio controller 130 and a speaker 132; an audio decoder 112; a video decoder 114; a secondary storage device 116; and an input device 118.

The DVD drive 106, audio decoder 112 and video decoder 114 comprise DVD system 115 which utilizes the computer system 100 having multimedia capabilities and software, such as Microsoft's DirectShow, to decode and render compressed audio-visual data, such as MPEG-2. DVD system 115 utilizes the computer's data bus 134 and the computer's existing hardware and software components to render the decoded video data to the video display subsystem 108 and the decoded audio data to the sound subsystem 110.

Now referring both to FIG. 2 and FIG. 3, the memory 102 contains an operating system 120, such as the MICROSOFT WINDOWS'® 95 or NT operating system available from Microsoft Corporation of Redmond, Wash., and a DVD player program 122. The DVD player program 122 is responsible for reading a DVD stream 200 from the DVD drive 106; separating the stream into separate audio, video, sub-picture, navigation, etc. streams; decoding the DVD stream 200 using the audio decoder 112 and the video decoder 114; and rendering both the audio portion and the video portion of the DVD stream 200 on the sound subsystem 110 and the video display subsystem 108, respectively, at the appropriate time and in synchronization. Both the audio decoder 112 and the video decoder 114 are implemented as components that may exist of either hardware components or software components or both for decoding the DVD stream 200.

As previously stated, the DVD player program 122 reads the DVD stream 200 from the DVD drive 106 and renders the DVD stream 200 using the video display subsystem 108 and the sound subsystem 110. The DVD player program 122 operates as an application under the control of the operating system 120 and utilizes the operating system 120 to access the DVD drive 106. As such, the DVD player program 122 reads the DVD stream 200 by requesting the operating system 120 to open a file-on the DVD drive 106 that contains the DVD stream 200. The DVD stream 200 is read from the DVD drive 106 using normal file system calls of the operating system 120.

When receiving the DVD stream 200 from the DVD drive 106 via the operating system 120, the DVD stream 200 comprises a number of frames 202, 204, 206, 208, 210 and 212. One skilled in the art will appreciate that a stream usually has many more frames. Each frame stores either audio data or video data and has a universal system clock reference ("$SCR_x$") 214, 226, 238 which may be a derivative of a 27 MHZ time base. All rendering of video and audio data may be performed with respect to the universal system clock reference to ensure a proper performance of the audio-visual work, and to prevent problems with lip synchronization and other audio-visual data. In addition to the $SCR_x$ 214, 226, 238 each frame has either an audio presentation time stamp ("$APTS_x$") 216, 228, 240 or a video presentation time stamp ("$VPTS_x$") 222, 234, 244. These audio and video presentation time stamps $APTS_x$ 216, 228, 240 and $VPTS_x$ 222, 234, 244 contain a value that, when reached by a clock initialized to the SCR 214, 226, 238 and running at a defined rate, indicates that the corresponding audio data ("$ADATA_x$") 218, 230, 242 or video data ("$VDATA_x$") 222, 234, 246 or sub-picture data ("$SPDATA_x$") 224, 236, 248 should be rendered.

Figure 4:
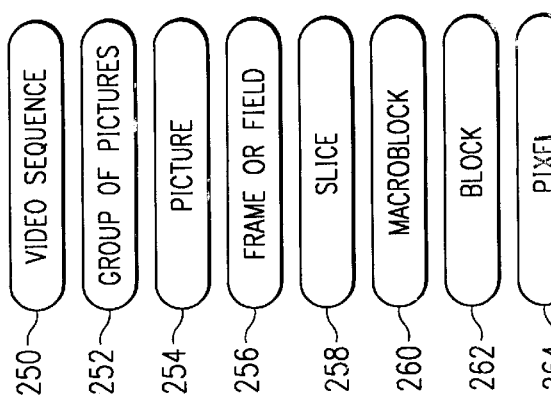
FIG. 4 is a representation of a general hierarchy of data structures for MPEG-2 video data.

Referring now to FIG. 4, which shows a general hierarchy of data structures for MPEG-2 video data. MPEG-2 can represent interlaced or progressive video sequences 250. Video sequence 250 may be divided into a group of pictures 252, which may be further divided into pictures 254. Each picture 254 may be further subdivided into frames or fields 256. Frame or field 256 may be further subdivided into slices 258. Slice 258 may be subdivided into macroblocks 260, which may be further subdivided into blocks 262. Blocks 262 may be further subdivided into pixels or pels 264. The data structures in FIG. 4 may be more readily understood with reference to FIG. 5.

Figure 5:
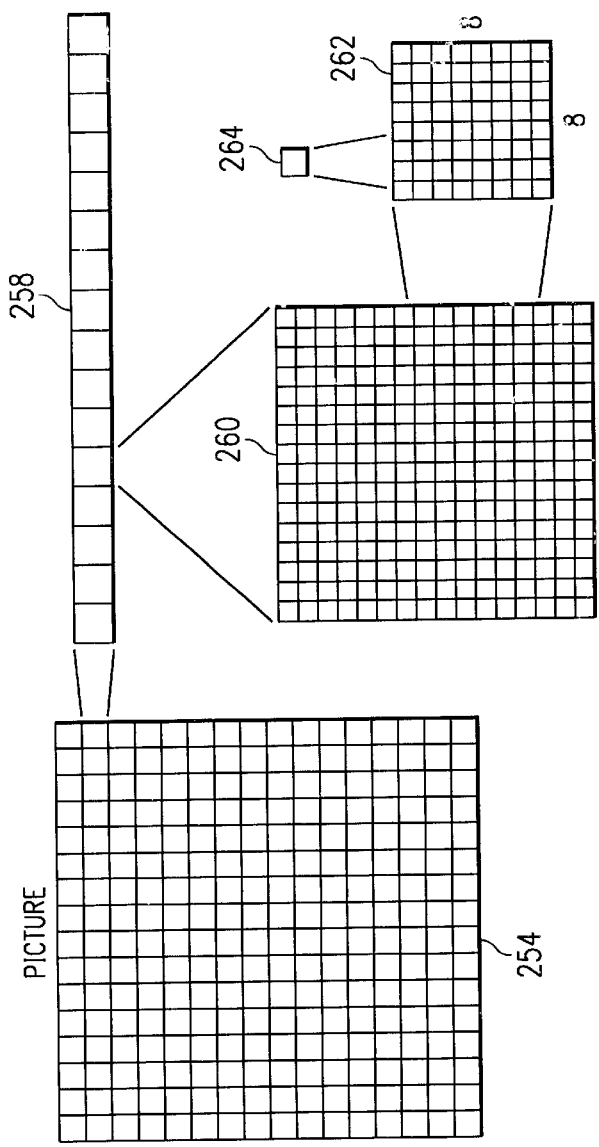
FIG. 5 depicts the individual components of a picture in a MPEG-2 video data structure.

As shown in FIG. 5, slice 258 of picture 254 may be divided into units of macroblocks 260, which are divided into blocks 262. All macroblock rows must start and end with at least one slice 258. Block 262 is the basic unit for DCT-based transform coding and is a data structure encoding an 8×8 sub-array of pixels 264.

Figure 6:
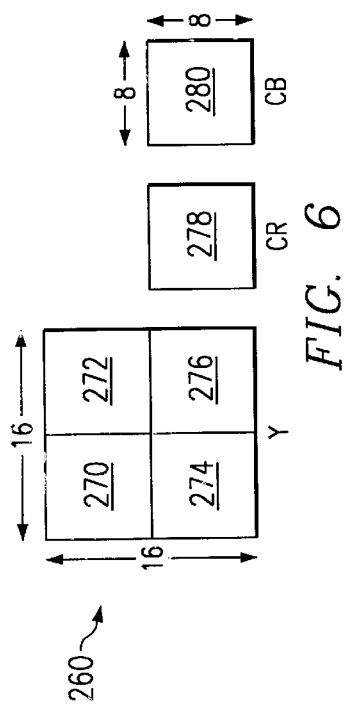
FIG. 6 is a structural representation of a macroblock.

Referring now to FIG. 6, macroblock 260 has a 16×16 array of luminance (Y) data and two 8×8 arrays of associated chrominance (Cr, Cb) data. Thus, macroblock 260 represents four luminance blocks 270, 272, 274, and 276, and two chrominance blocks 278 and 280. In video broadcasting, for example, in lieu of using RGB information, chrominance and luminance data are used, which in digital form is YCbCr. Y is the luminance component; Cb (Blue-yellow) and Cr (Red-yellow) are the two chrominance components.

Since the human eye is very insensitive to color and very sensitive to intensity, a lower bandwidth is possible for the chrominance, which is sub-sampled in two dimensions. Thus, there is twice as much luminance information as there is chrominance information.

The chrominance samples are typically sampled at half the sampling rate of the luminance samples in both vertical and horizontal directions, producing a sampling mode of 4:2:0 (luminance:chrominance:chrominance). The chrominance, however, may also be sampled at other frequencies, such as one-half the sampling rate of the luminance in the vertical direction and the same sampling rate as luminance in the horizontal direction, producing a sampling mode of 4:2:2.

Figure 7A:
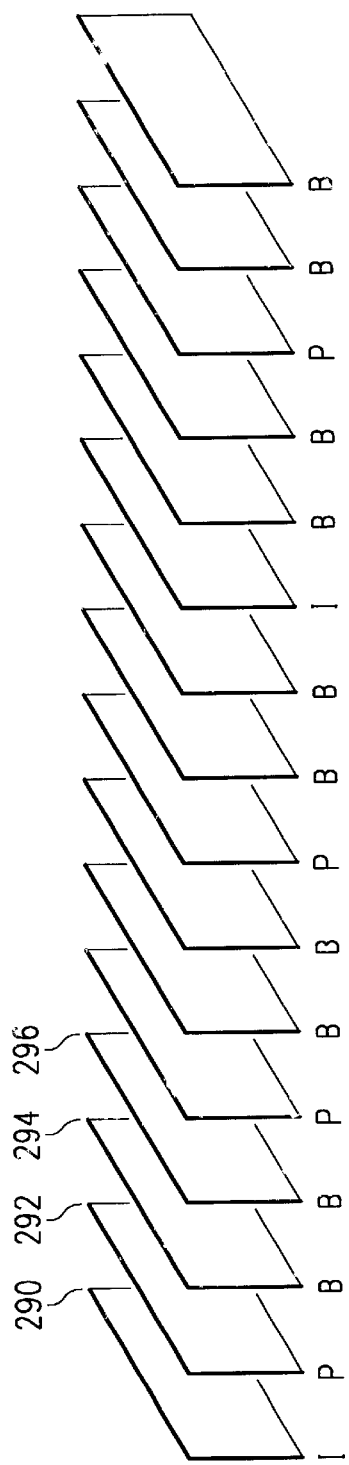
FIG. 7A depicts the typical frame storage and decode order for MPEG-2 video.

Referring now to FIG. 7A, which depicts a typical frame storage and decode order for MPEG-2 video. MPEG-1 and MPEG-2 support multiple types of coded frames: intra (I) frames 290, forward predicted (P) frames 292, and bidirectionally predicted (B) frames 294 and 296. This order is different from the display order (FIG. 7B) because both an I frame 290 and a P frame 292 have to be decoded before the B frames 294 and 296 can be decoded.

Figure 7B:
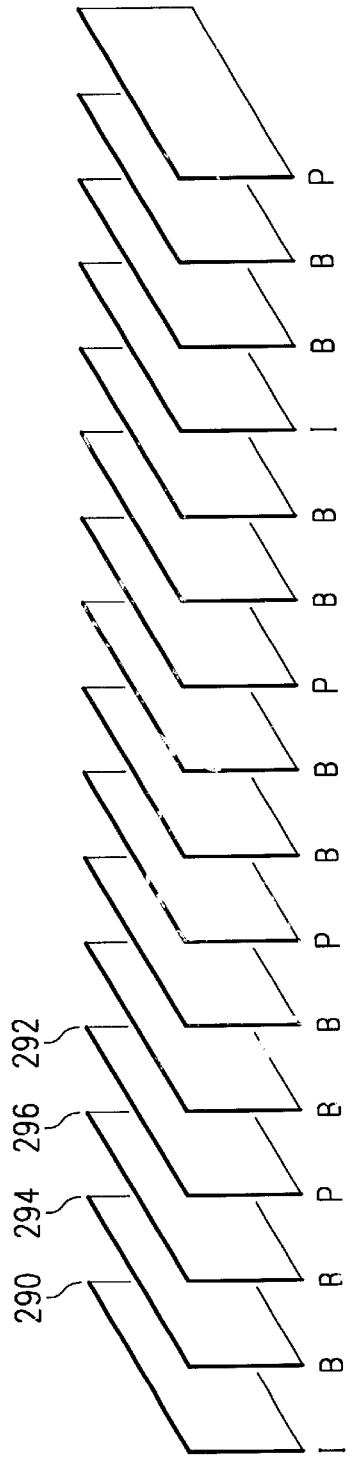
FIG. 7B depicts the typical frame display order for MPEG-2 video.

Referring now to FIG. 7B, which depicts a typical frame display order for MPEG-2 video. Displaying an I frame 290 every twelveth frame, IBBPBBPBBPBBIBBP, is based on the practical desire to have a new starting point at least every 0.4 seconds. An I frame 290 contains intrapicture coding; it is a frame coded as a still image without using any previous or future frames. I frames 290 and P frames 292 are used as reference frames for interpicture coding. Intrapicture coding for I frames 290 involves the reduction of redundancy between the original pixels and the macroblocks using block-based Discrete Cosine Transform ("DCT") techniques, although other coding techniques can be used.

P frames 292 and B frames 294 and 296 may contain both intrapicture and interpicture coding. P frames 292 are predicted from the most recently reconstructed I frames 290 or P frames 292. B frames 294 and 296 are predicted from the two closest I or P frames 290 or 292, one in the past and one in the future. For P frames 292 and B frames 294 and 296, intrapicture coding involves using the same DCT-based techniques to remove redundancy between interpicture prediction error pixels.

In interpicture coding, the redundancy between two pictures is eliminated as much as possible and the residual difference, i.e., interpicture prediction errors, between the two pictures are transmitted. In scenes where objects are stationary, the pixel values in adjacent picture will be approximately equal. In scenes with moving objects, block-based motion compensation prediction, based on macroblocks, is utilized.

For each macroblock 260 (FIG. 5) in a P frame 292, the best matching 16×16 block in the previous picture, i.e., the prediction block, is found, and the resultant macroblock prediction error is then encoded. The match is determined by searching in a previous picture over a neighborhood of the pixel origin of the current macroblock. The motion vectors between the current macroblock and the prediction block are also transmitted in interpicture coding that uses motion compensation. The motion vectors describe how far and in what direction the macroblock has moved compared to the prediction block.

Figure 8:
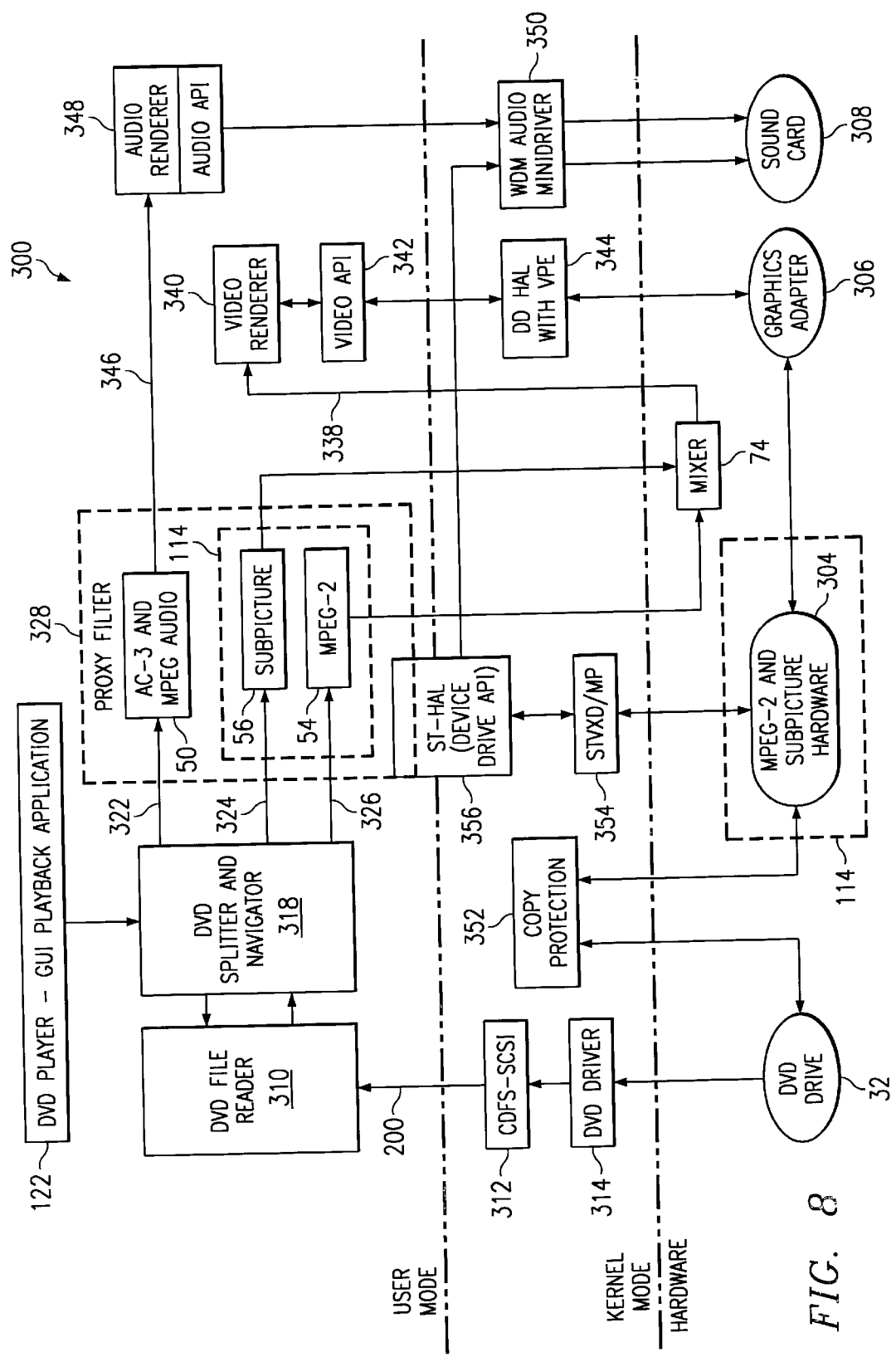
FIG. 8 depicts one embodiment of the present invention with a computer multimedia architecture utilizing a DVD system.

Turning now to FIG. 8, one of the preferred embodiments of the present invention is depicted as a computer multimedia architecture utilizing a DVD system and is denoted generally as 300. A preferred embodiment of the invention uses a multi-media Application Programming Interface (API), such as Microsoft's DirectShow® or other suitable multi-media API, to decode and render AC-3 audio, MPEG-2 video, PCM audio and MPEG-2 audio. The multimedia API enables the capture and playback of multimedia streams, which may contain video and audio data compressed in a wide variety of formats, including MPEG, Apple QuickTime, Audio-Video interleaved ("AVI"), and WAV files.

A preferred embodiment of the invention uses separate producer/consumer components or threads of execution to separate input, output and decoding. Using existing software and hardware components that typically are part of a multimedia computer and incorporating new systems and methods provide enhanced functionality and implementations for DVD technology and computers.

The DVD player 122 is a playback application that provides a Graphical User Interface ("GUI"). DVD player 122 may be displayed as a bitmap image drawn inside an Microsoft Foundation Class ("MFC") generated dialog box. The DVD player 122 may load an ActiveMovie graph and the DVD player may translate user button events into graph events and send the events to the DVD splitter and navigator 318. Performance operations may include such operations as video playback, unbroken AC-3 audio playback, audio-video sync, on screen sub-picture decoding and many others.

The DVD drive 32 may hold a DVD that holds large amounts of computer data and may be a single sided or double sided disc, single-layered or double-layered disc, which can hold up to 18 gigabytes of compressed data. For example, a DVD may provide up to 8 language versions of sound tracks, up to 32 subtitle tracks, up to 8 different ratings or angles and support for interactive branching. The DVD driver 314 provides the kernel mode software capabilities of reading data sectors from DVD drive 32. The CD File System—Small Computer Serial Interface (CDFS-SCSI) 312 and the DVD driver 314 are examples of SCSI interfaces and drivers that may be used to access the DVD drive 32 and may be part of the overall operating system 120 (FIG. 2) or may be purchased separately and installed with the purchase of a DVD drive 32.

The DVD file reader 310 reads the DVD stream 200 from the DVD drive 32. The DVD splitter and navigator 318 instructs the DVD file reader 310 as to which file to read from the DVD drive 32. The DVD stream 200 is then split into multiple streams for audio 322, sub-picture 324 and video 326. As was described in reference to FIG. 3, the DVD stream 200 comprises frames 202, 204, 206, 208 . . . 210, 212. Each audio frame 202, 206 . . . 210 comprises a $SCR_x$ 214, 226 . . . 238, an $APTS_x$ 216, 228 . . . 240 and a $ADATA_x$ 218, 230 . . . 242. Each video frame 204, 208 . . . 212 comprises a $SCR_x$ 214, 226 . . . 238, a $VPTS_x$ 220, 232 . . . 244, a $VDATA_x$ 222, 234 . . . 246, and $SPDATA_x$ 224, 236 . . . 248. The video data may comprise compressed data using standard compression techniques such as MPEG-1, MPEG-2 and MPEG-4. The audio stream 322 may comprise compressed data such as ISO standard AC-3, MPEG or PCM standard format. Navigation information is filtered out of the DVD stream 200 and used to instruct the DVD splitter and navigator 318 how and when to render the audio, sub-picture and video streams 322, 324 and 326.

The audio, sub-picture and video streams 322, 324 and 326 are read into the proxy filter 328. The proxy filter 328 feeds the streams 322, 324 and 326 to one of three decoders which may include but are not limited to: AC-3 or MPEG audio decoder 50, sub-picture decoder 56, and MPEG-2 decoder 54. Proxy filter 328 provides an interface to the hardware components within architecture 300 and synchronizes the audio, sub-picture and video streams 322, 324 and 326.

Now also referring to FIGS. 2 and 3, the proxy filter 328 reads the first occurring $SCR_1$ 214 from the audio, sub-picture and video streams 322, 324 and 326. After reading the $SCR_1$ 214, the proxy filter 328 stores the $SCR_1$ 214 into the time-stamp counter of the CPU 104 and starts the time counter 124, which typically runs at 27 MHZ. The proxy filter 328 starts a separate thread for executing the time counter 124 using a well known create thread system call of the operating system 120. After starting the time counter 124, all audio and video data is rendered with respect to the value of the time counter 124. The proxy filter 328 reads presentation time stamp $APTS_1$ 216 from the first audio frame encountered 202. After reading the $APTS_1$ 216, the proxy filter 328 invokes the audio decoder 50 to decode the audio data $ADATA_1$ 218 corresponding to the $APTS_1$ 216. The proxy filter 328 then reads the video presentation time stamp $VPTS_1$ 220 from the first video frame encountered 201 in the DVD stream 200 and invokes the MPEG-2 video decoder 54 to decode the video data $VDATA_1$ 222 and the sub-picture decoder 56 to decode the sub-picture data $SPDATA_1$ 224. The proxy filter 328 uses existing synchronization technology, a further description of which may be found in United States patent application: Reading an Audio-Visual Stream Synchronized by a Software Clock in a Personal Computer, Ser. No. 08/762,616, which is owned by STMicroelectronics and is hereby incorporated by reference. Moreover, the proxy filter 328 is programmable in the field with software, which may update the proxy filter 328, add new features, and add, delete or replace decoders.

Video decoding and sub-picture decoding may be partitioned into a hardware section 304 and software section 114 comprising sub-picture decoder 56 and MPEG-2 video decoder 54. The preferred embodiment of the invention uses software decoders that conform to multi-media APIs, such as Direct Show API. Sub-picture decoder 56 acts as a filter and passes sub-picture data 324 to the MPEG-2 and sub-picture hardware 304 for decoding. The outputs of the MPEG-2 video decoder 54 and the sub-picture decoder 56 are fed to mixer 336. The mixer 336 is a hardware device used to combine the output of the MPEG video decoder 54 and the sub-picture decoder 56 so that a low bandwidth video sequence, such as a closed captioning or picture in a picture may be over-layered with the original video content. The combined decoded video data 338, which is the output of the mixed MPEG-2 video decoder 54 and the sub-picture decoder 56, may be placed in a memory buffer in a YCrCb color conversion format.

The video renderer 340 outputs the combined decoded video data 338 to a video API 342, such as Direct Draw with VPE. The video renderer 340 reads and writes data to and from the video API 342. The video renderer 340 provides the intelligence on how to manipulate the combined decoded video data 338, i.e. when to render the data, what is the output format for the video data, what color space conversions to use, whether sub-picture gets included with the video output, etc. The video renderer 340 also communicates to the graphics adapter 306 through a series of layers provided with the operating system 120. The video API 342 and a DD hardware abstraction layer ("HAL") with VPE 344 provides a communications layer between the hardware and software components.

Audio decoding, which may include AC-3, MPEG audio and PCM audio, is exclusively decompressed by software. AC-3 audio decoder 50 takes the compressed audio stream 322 and decodes and decompresses the audio stream 322 and outputs a Pulse Code Modulated ("PCM") sample audio. The AC-3 audio decoder output 346 is made available to the audio renderer 348. The audio renderer 348 communicates with the sound card 308 through multiple layers of software drivers, such as a WDM audio minidriver 350. The audio output and the video output to the respected adapter card must be synchronized to produce desired results. The present invention can include copy protection 352, STVXD/MP 354 and ST-HAL (Device Drive API) 356.

Turning now to FIG. 9, an architecture of the DVD splitter and navigator is depicted and denoted generally as 400. The DVD splitter and navigator 318 provides the intelligence for rendering video and audio data. The DVD stream 200 read from the DVD drive 32 also comprises navigation information. The navigation information comprises parametric values defining how the DVD drive 32 is read and how and when data is presented.

The interpreter 402 is a pre-programmed function which transforms the input X 404 into a value Y 406 defined by the transfer function h(X) 402. The interpreters 402 transfer function h(X) is a parametric function defined by the user input command or information contained in the navigation packet. For example, if the user selects a track from the DVD disc the interpreter function acts to extract the desired sequence from the video and audio stream or requests that information on the DVD drive 32 is retrieved. The interpreter places the desired output into memory 408. The splitting function 410 separates the DVD stream 200, which may include such compression standards as MPEG-2 video, AC-3 audio, sub-picture video and MPEG audio. The parsed outputs 322, 324 and 326 are fed into the proxy filter 328 where the streams 322, 324 and 326 are synchronized and partially decoded.

Figure 10:
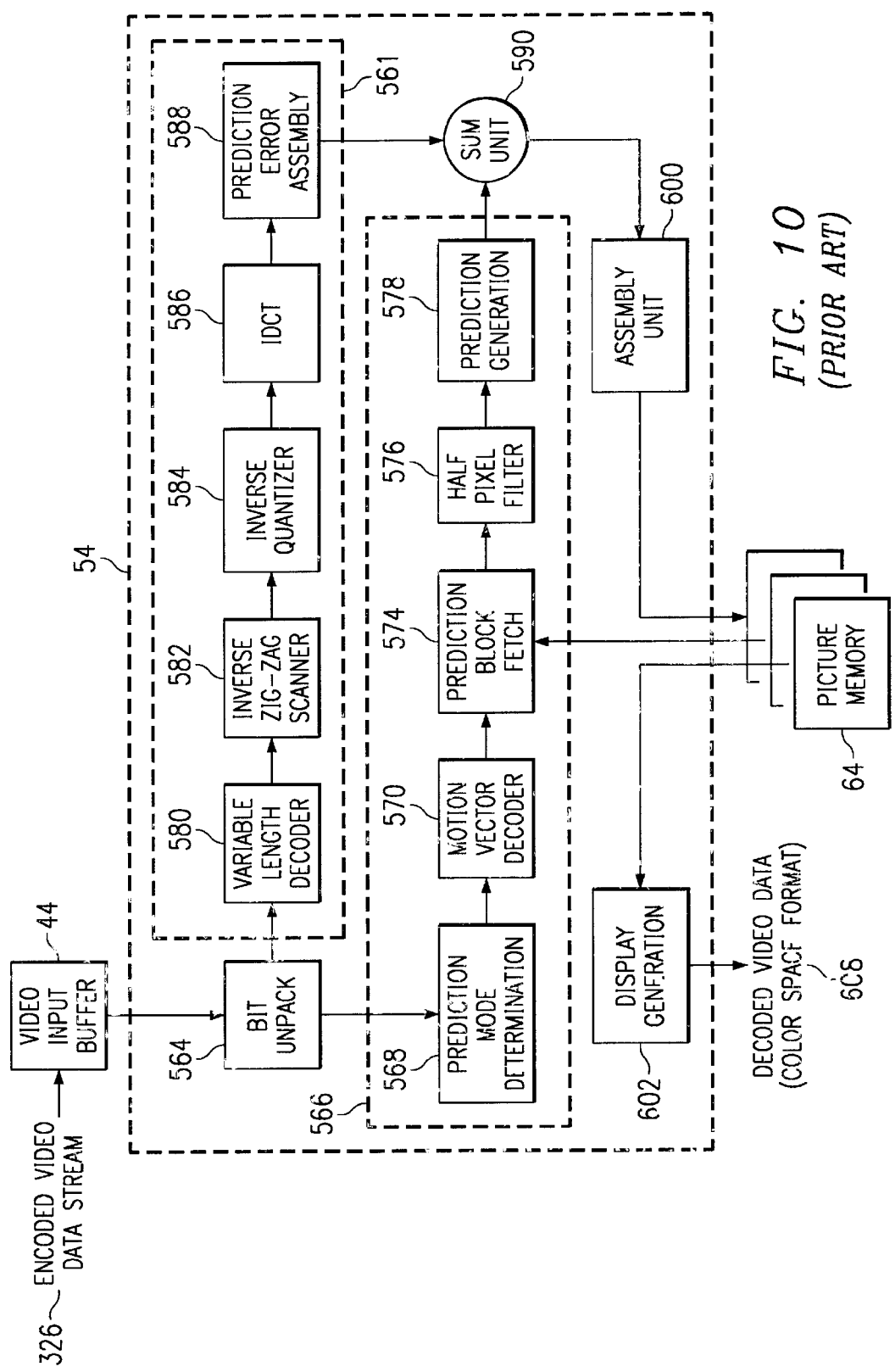
FIG. 10 is a block diagram of the architecture of a typical MPEG-2 decoder.

FIG. 10 shows a block diagram of the architecture of a typical MPEG-2 video decoder 54. The MPEG-2 video decoder 54 is sub-divided into a block decode section 561 and a motion compensation pipeline 566. An encoded video bitstream is received by a video input buffer 44, which is typically a first-in-first-out ("FIFO") buffer, but may be any type of memory. Video input buffer 44 buffers the incoming encoded video data stream 326 while previously received data is being decoded.

The encoded video data stream 326 contains compressed frames. A frame is a data structure representing the encoded data for one displayable image in the video sequence. This data structure consists of one two-dimensional array of luminance pixels, and two two-dimensional arrays of chrominance samples, i.e., color difference samples.

The compressed frame is parsed into smaller subunits by a bit unpack 564. Bit unpack 564 parses the information into macroblocks, and then parses the macroblocks and sends the header portion of each macroblock to a motion compensation pipeline 566. Using prediction mode determination block 568, the motion compensation pipeline 566 determines the frame type being processed (I, P or B) and determines which prediction frames must be accessed from picture memory 64. Using the motion vector information from motion vector decode 570, motion compensation pipeline 566 also determines the address in picture memory 64 where the prediction frame, and the prediction macroblock within the frame are located. This information is needed to decode the motion compensated prediction for the given macroblock to be decoded.

The prediction macroblock is obtained from picture memory 64 and is input into a prediction block fetch 574 and then into half pixel filter 576. Half pixel filter 576 performs vertical and horizontal half-pixel interpolation on the fetched prediction macroblock as dictated by the motion vectors. The prediction macroblocks are generated in prediction generation circuit 578.

Bit unpack 564 sends the encoded block data structures to a variable length decoder 580, which decodes variable length codes representing the encoded blocks and converts them into fixed length pulse code modulation ("PCM") codes. These codes represent the DCT coefficients of the encoded blocks. The PCM codes are a serial representation of the 8×8 block array obtained in a zig-zag format. An inverse zig-zag scanner 582, which is connected to the variable length decoder 580, converts the serial representation of the 8×8 block array obtained in a zig-zag format to a rectangular 8×8 block array. The coefficients are ordered in a rectangular array format, with the largest value in the top left of the array and typically decreasing in value to the bottom right of the array.

The rectangular array is passed to an inverse quantizer 584, which performs the inverse quantization based on the appropriate quantization tables. The data is then passed to an inverse DCT ("IDCT") circuit 586, which performs an inverse DCT on its input block and produces a decompressed 8×8 block. The decompressed 8×8 block is then passed to the prediction error assembly 588, which generates the interpicture prediction errors.

The prediction macroblock from prediction generation 578 and the interpicture prediction errors from the prediction error assembly 588 are summed in a macroblock sum unit 590 and then passed to picture assembly unit 600. In MPEG-2 and other decompression protocols that use interpicture compression, the frames are encoded based on past and future frames; therefore in order to decode the frames properly the frames are not sent in order and need to be stored until they are to be displayed. A typical MPEG-2 video decoder 54 requires 16 Mbits of memory to operate in the main profile at main level mode (MP at ML). Therefore, MPEG-2 video decoder 54 may require a 2 Mbyte memory.

Assembly unit 600 ensures that the information is placed in the correct place in picture memory 64 to correspond to the frame being decompressed. The resulting decoded macroblock is then stored in picture memory 64 in the place designated for it by assembly unit 600. All frames should be stored in picture memory 64 because the decoded macroblock may not be the next macroblock that is to be sent to display generation 602 due to the storing and transmission format of the decompression protocol. Display generation 602 sends the decoded video data 608 in a color space format to be displayed.

MPEG-2 video decoder 54 may be designed to decode a bitstream formatted according to any one or a combination of standards. To decode a bitstream formatted according to a combination of standards, video decoder 54 needs to include circuitry in order to encode a bitstream to comply to a particular decompression protocol. Video decoder 54 may be a combination of decoders, and possibly encoders, for each desired decompression protocol. For example, video decoder 54 may decompress a bitstream encoded to comply to either the MPEG-2 standard or the H.261 standard which contains two sets of decoding circuitry with each set containing its own motion compensation circuits, its own block decoding circuits, one for each of the standards and specific to that particular standard.

Figure 11:
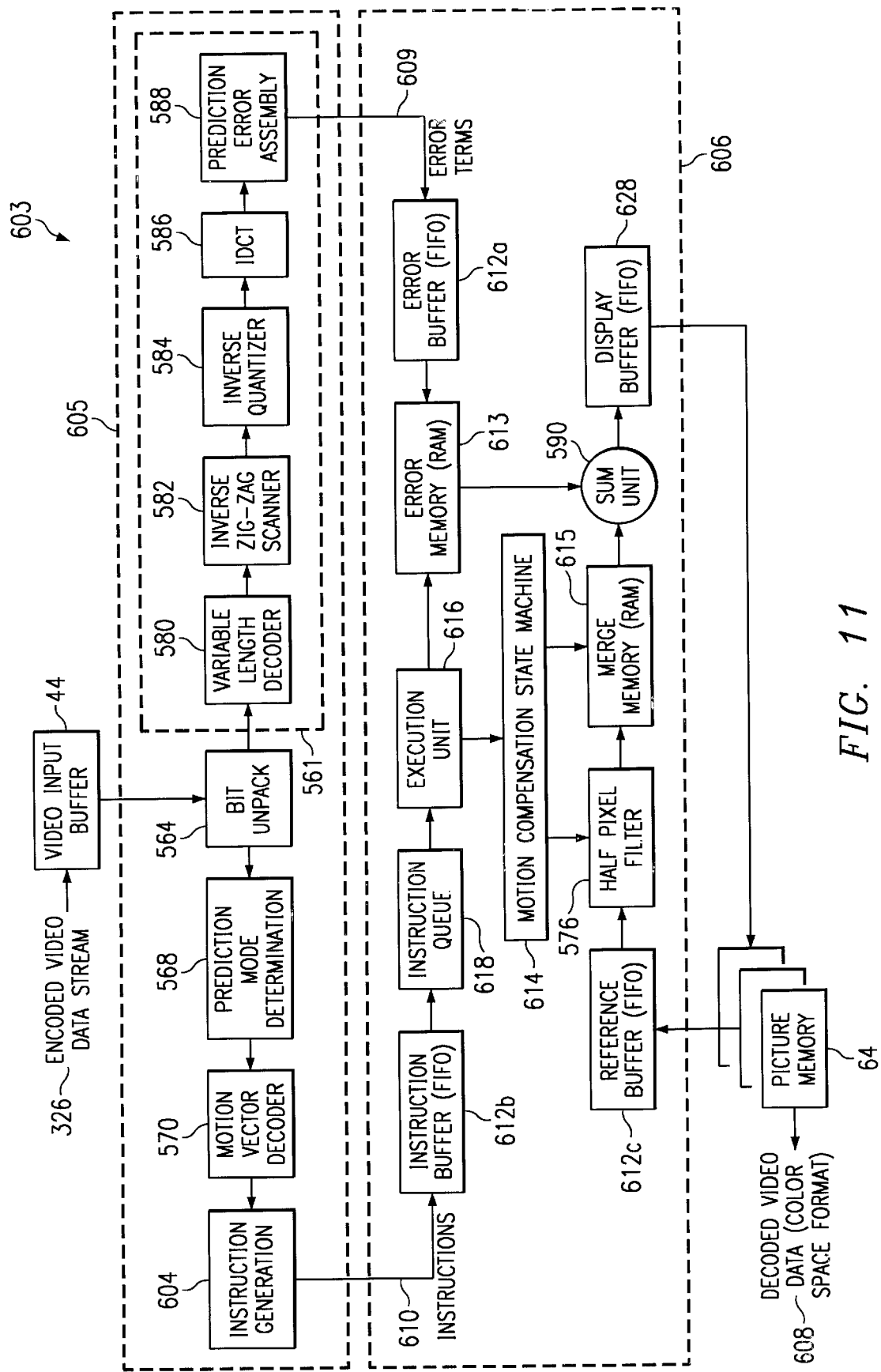
FIG. 11 is a block diagram of the architecture of a MPEG-2 decoder with and instruction driven motion compensation engine in accordance with one embodiment of the present invention.

Turning now to FIG. 11, a block diagram for a MPEG-2 video decoder with an instruction driven motion compensation engine is illustrated and is denoted generally as 603. The video input buffer 44, bit unpack 564, block decode section 561, variable length decoder 580, inverse zig-zag scanner 582, inverse quantizer 484, IDCT 586, prediction error assembly 588, prediction mode determination 568 and motion vector decode 570 provide the same functions as described in reference to FIG. 10.

The error terms 609, which are derived from the series of DCT coefficients by the prediction error assembly 588, are placed in the error buffer (FIFO) 612a. The instructions 610, which are generated by instruction generator 604, are placed in the instruction buffer (FIFO) 612b. The instructions 610 are then passed to the instruction queue 618, which is communicably coupled to the execution unit 616. The execution unit 616 is communicably coupled to the error memory (RAM) 613 and the motion compensation state machine 614. The motion compensation state machine 614 is communicably coupled to and provides functional operation commands to the half pixel filter 576 and the merge memory (RAM) 615.

As was the case with FIG. 10, picture data is stored in the picture memory 64 and is fetched for use in the instruction driven compensation engine 606. The picture data is placed in the reference buffer 612c before it is moved to the half pixel filter 576. After the error terms from the error memory 613 are summed with the prediction macroblock from the merge memory 615 in sum unit 590, the resulting data is stored in the display buffer 628 before it is moved to picture memory 64 and later displayed.

The execution unit 616 synchronizes the operation of the instruction driven motion compensation pipeline 606 and the block decode section 561 when the data stored in the error memory (RAM) 613 and the merge memory (RAM) 615 are to be summed in sum unit 590. Otherwise, these two processing sections are decoupled and operate independently. This implementation allows the instruction driven motion compensation pipeline 606 to be specified and implemented separately from the block decode section 561 with minimal coordination. The calculation of memory addresses and generation of pipeline control information may proceed in parallel with the data manipulation. In addition, parsing and data filtering become non-critical functions.

The instruction driven motion compensation pipeline 606 may be used independently and may be implemented in hardware or software. Although both the block decoder 605 and the instruction driven motion compensation engine 606 may be implemented in software, the processing load of the CPU 104 (FIG. 2) may be substantially reduced by implementing the instruction driven motion compensation pipeline 606 in hardware.

The instruction transferred to the instruction driven motion compensation pipeline 606 from the motion compensation state machine 614 comprises instruction descriptors and data descriptors. Each instruction is a group of descriptors or instruction sequences and data descriptors. The instruction descriptors and data descriptors provide instructions for processing the predictions blocks and the DCT coefficients. The instructions also comprise memory locations for each prediction block. For example, a load instruction reads and filters a macroblock and loads the result into the merge memory 615. A merge instruction reads and filters a macroblock and then sums the result with the contents of the merge memory 615. A store or write instruction sums the contents of the merge memory 615 and error memory 613 and puts the result back into picture memory 64.

The prediction block is obtained from data memory 612c and input into the half-pixel filter 576, which is coupled to the motion compensation state machine 614. The motion compensation state machine 614 controls the interfaces to the memory. The half-pixel filter 576 performs vertical and horizontal half-pixel interpolation on the fetched prediction block as dictated by the motion vector. The merge memory 615 allows multiple reference macroblocks to be averaged together to form the prediction blocks. The prediction errors and the prediction blocks are summed in the sum unit 590 and placed in the output buffer (FIFO) 628, which may be any conventional memory such as Dynamic RAM ("DRAM").

FIG. 12 depicts the instruction sequence for a typical prediction block and is denoted generally as 710. The instructions include load instructions for $1^{st}$ Y prediction block(s) in a macroblock, merge instructions for $2^{nd}$ Y prediction block(s) in the macroblock and write instructions for the resultant block(s) in the macroblock. The load, merge and write instructions for the chrominance components of each macroblock are performed in the same fashion as the luminance component of each macroblock.

Figure 13:
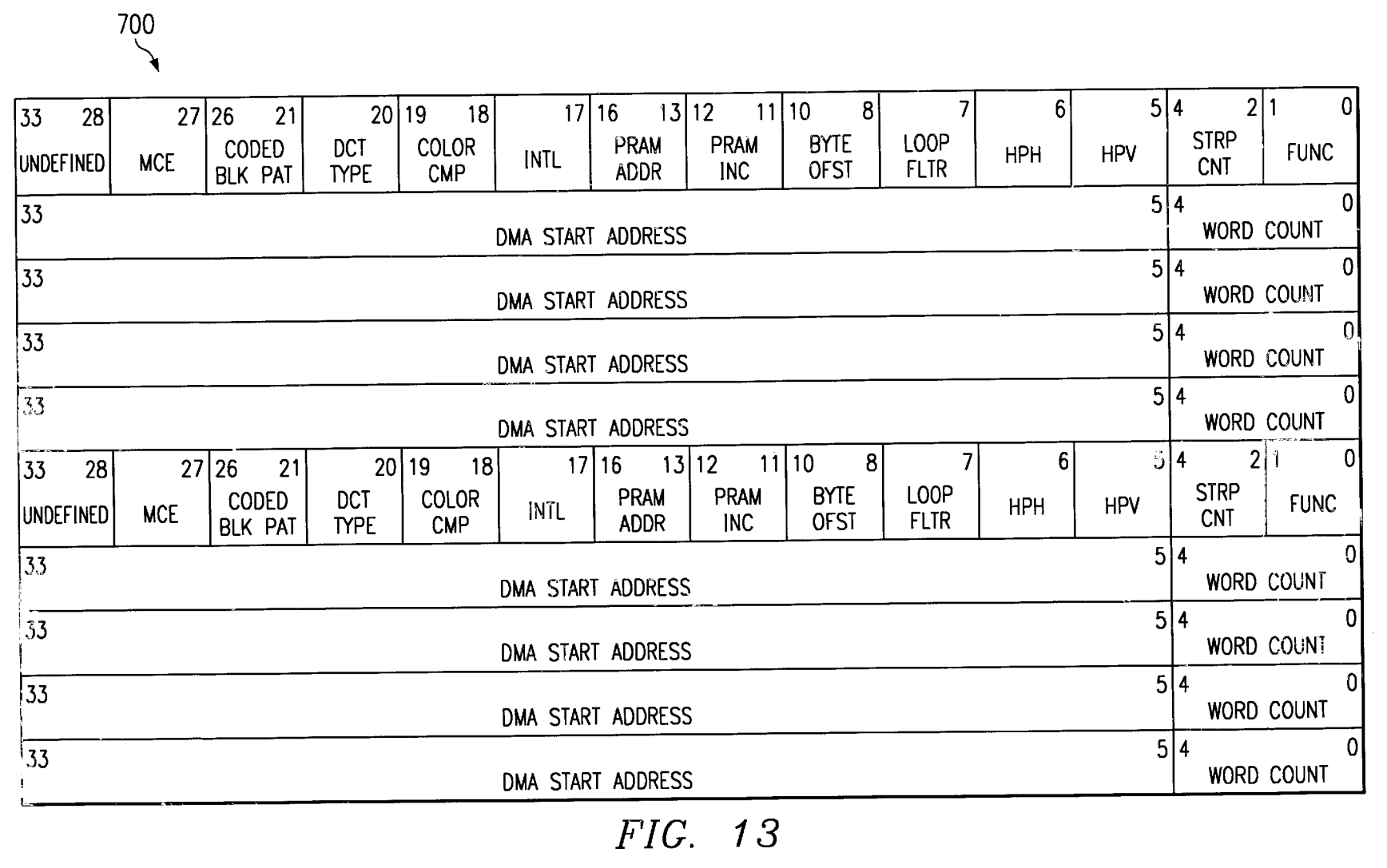

Turning now to FIG. 13, an instruction structure for prediction blocks is depicted and denoted generally as 700. The instruction structure details functional operation commands such as loading a prediction block in merge memory and merging a prediction block with existing data in merge memory and writing data resulting from the summation of data in merge memory and error memory to an output memory. Portions of the instruction structure also control interlacing the data and enabling half pixel prediction. The instruction descriptor comprises a function code, a stripe count (the number of data descriptors following the instruction descriptor), a vertical half pixel prediction, a horizontal half pixel prediction, a byte offset, and an interlace code. Each data descriptor comprises a word count and a starting memory address.

Figure 14A:
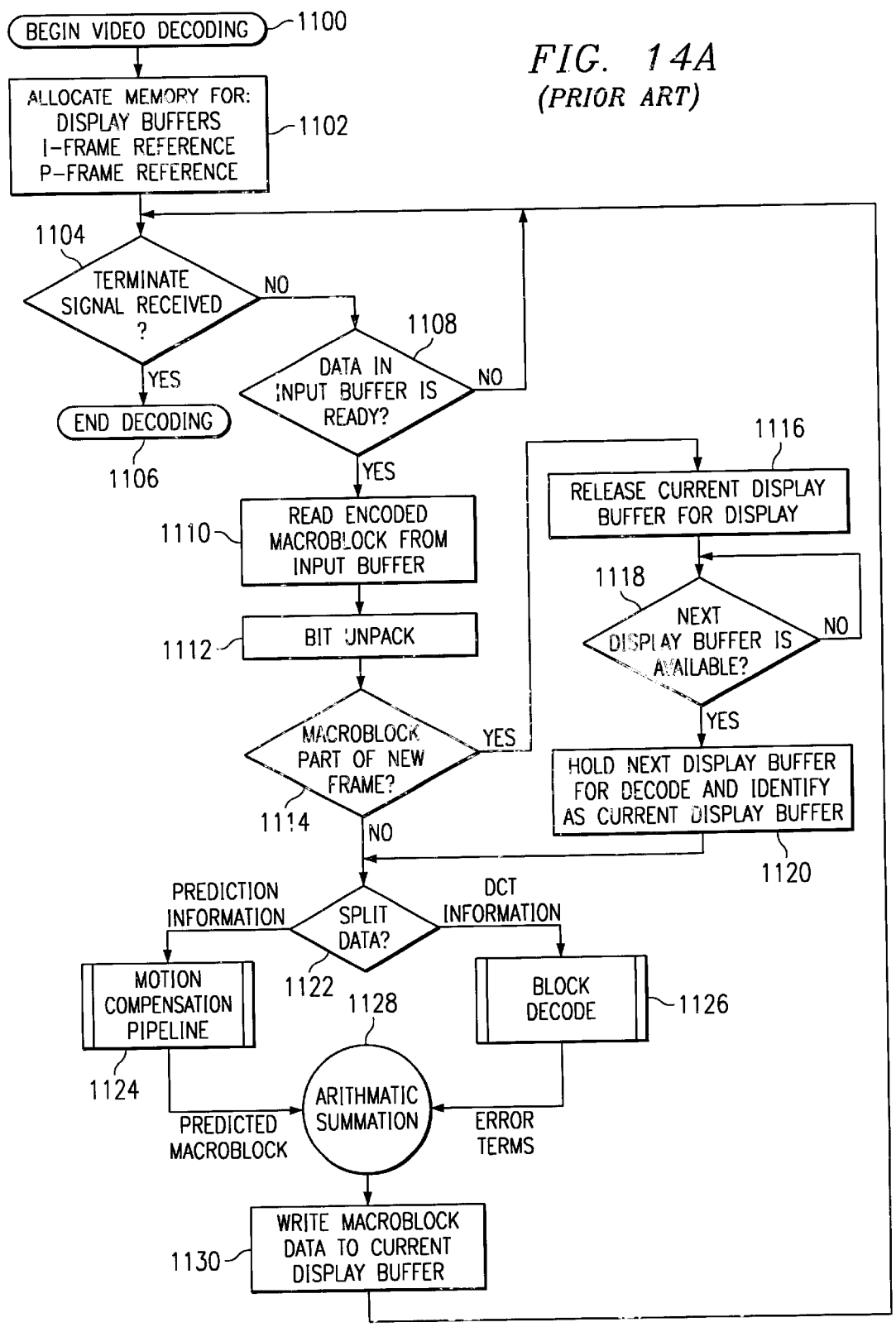

Turning now to FIG. 14A, a flowchart depicting the steps of a video decoder in accordance with the prior art will be described. Video decoding begins in block 1000 and memory is allocated for display buffers, I frame reference buffer and P frame reference buffer in block 1102. If a terminate signal has been received, as determined in decision block 1104, decoding ends in block 1106. If, however, a terminate signal has not been received and encoded video data is ready in the video input buffer, as determined in decision block 1108, the encoded macroblock is read from the video input buffer in block 1110. If, however, encoded video data is not ready in the video input buffer, processing continues to loop until a terminate signal is received, as determined in decision block 1104 or the encoded data is ready in the video input buffer, as determined in decision block 1108.

After the encoded macroblock is read in block 1110, the macroblock is bit unpacked in block 1112. If the macroblock is part of a new frame, as determined in decision block 1114, the current display buffer is released for display in block 1116. Thereafter, processing will wait until the next display buffer is available, as determined in decision block 1118. Once the next display buffer is available, it is held for use by the decoder and is identified as the current display buffer in block 1120. Once the next display buffer is held and identified, or if the macroblock is not part of a new frame, as determined in decision block 1114, processing of the macroblock is split in block 1122.

The prediction information is processed using a motion compensation pipeline in block 1124, which will be described in detail in reference to FIG. 14B. The DCT information from block 1022 is processed using a block decode process in block 1126, which will be described in detail in reference to FIG. 14C. The resulting predicted macroblock from block 1124 and the error terms from block 1226 are summed together in block 1128 to produce a decoded macroblock. Next, the decoded macroblock is written to the current display buffer in block 1130. Thereafter, processing loops back to decision block 1104 where a terminate signal is checked for.

Now referring to FIG. 14B, the motion compensation pipeline of block 1124 will be described. Motion compensation begins in block 1140 and blocks 1142, 1144 and 1154 preform prediction mode determination. If a P frame is currently being decoded, as determined in decision block 1142 and the macroblock to be decoded is a P macroblock, as determined in decision block 1144, motion compensation is performed on the macroblock in block 1146, which will be described in detail below in reference to FIG. 14D. Once the motion compensation of block 1146 is complete or the macroblock to be decoded is an I macroblock, as determined in decision block 1144, the macroblock is written to the P frame reference buffer in block 1148 and the predicted macroblock is returned in block 1150. If, however, an I frame is currently being decoded, as determined in decision block 1142, the macroblock is written to the I frame reference buffer in block 1152 and the macroblock is returned as a predicted macroblock in block 1150. If, however, a B frame is currently being decoded, as determined in decision block 1142 and the macroblock to be decoded is a B macroblock or a P macroblock, as determined in decision block 1154, motion compensation is performed on the macroblock in block 1156, which will be described in detail below in reference to FIG. 14D. Once the motion compensation of block 1156 is complete or the macroblock to be decoded is an I macroblock, as determined in decision block 1154, the predicted macroblock is returned in block 1150.

Now referring to FIG. 14C, the block decode process 1126 will be described. Block decoding begins in block 1160 and variable length decoding is performed in block 1162. An inverse zig-zag function is performed in block 1164 followed by an inverse quantization in block 1166 and an inverse DCT function in block 1168. The error terms are then generated in block 1170 and are returned in block 1172.

Now referring to FIG. 14D, the motion compensation process of blocks 1146 and 1156 will be described. Motion compensation begins in block 1180 and the motion vectors are decoded in block 1182. Next, the required macroblock to perform the motion compensation is retrieved from the I frame and/or P frame reference buffer as required in block 1184. The retrieved macroblock is then passed through a half pixel filter in block 1186 and the predicted macroblock is generated in block 1188. Thereafter, the predicted macroblock is returned in block 1190.

Figure 15A:
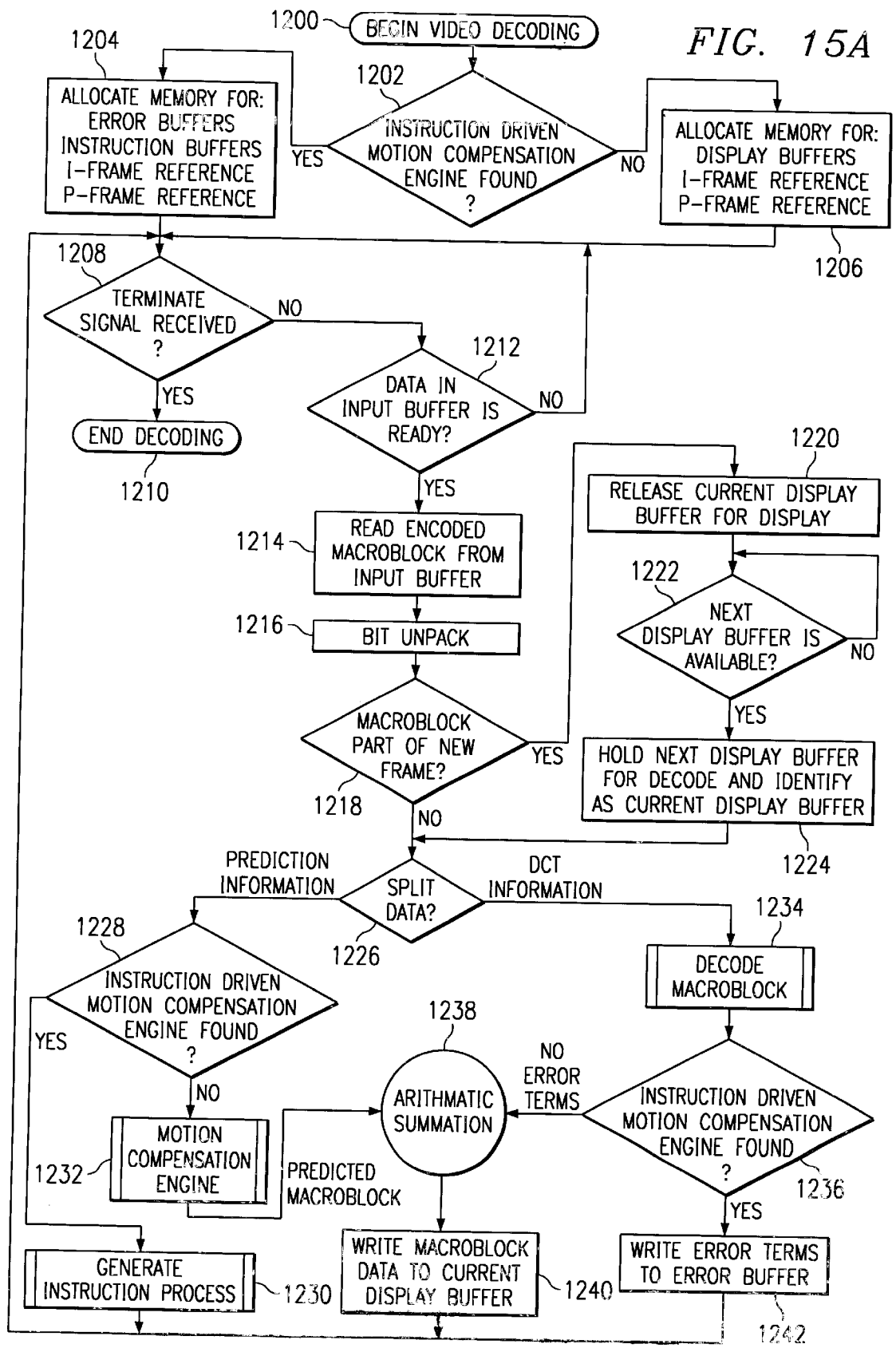
FIGS. 15A, 15B, 15C, 15D and 15E are flowcharts depicting the steps of a video decoder in accordance with one embodiment of the present invention.

Turning now to FIG. 15A, a flowchart depicting the steps of a video decoder in accordance with one embodiment of the present invention will be described. Video decoding begins in block 1200. If an instruction driven motion compensation engine is detected by the system or the decoded output is selected to be in an instruction format, as determined in decision block 1202, memory is allocated for an error buffer, instruction buffer, I frame reference buffer and P frame reference buffer in block 1204. If, however, an instruction driven motion compensation engine is not detected or the decoded output is to be in a color space format, as determined in decision block 1202, memory is allocated for display buffers, I frame reference buffer and P frame reference buffer in block 1106.

Although the format of the decoded output could be selected manually, an automatic evaluation of the computer system at the start of the decoding process can select an optimal decoding output based on various performance parameters. For example, utilizing a separate chip to perform the motion compensation functions greatly reduces the demand or "churn" on the system processor.

After sufficient memory has been allocated in block 1204 or 1206, decision block 1208 determines whether or not a terminate signal has been received. If a terminate signal has been received, decoding ends in block 1210. If, however, a terminate signal has not been received and the encoded video data is ready in the video input buffer, as determined in decision block 1212, the encoded macroblock is read from the video input buffer in block 1214. If, however, encoded video data is not ready in the video input buffer, processing continues to loop until a terminate signal is received, as determined in decision block 1208 or the encoded data is ready in the video input buffer, as determined in decision block 1212.

After the encoded macroblock is read in block 1214, the macroblock is bit unpacked in block 1216. If the macroblock is part of a new frame, as determined in decision block 1218, the current display buffer is released for display in block 1220. Thereafter, processing will wait until the next display buffer is available, as determined in decision block 1222. Once the next display buffer is available, it is held for use by the decoder and is identified as the current display buffer in block 1224. Once the next display buffer is held and identified, or if the macroblock is not part of a new frame, as determined in decision block 1218, processing of the macroblock is split in block 1226.

Figure 15B:
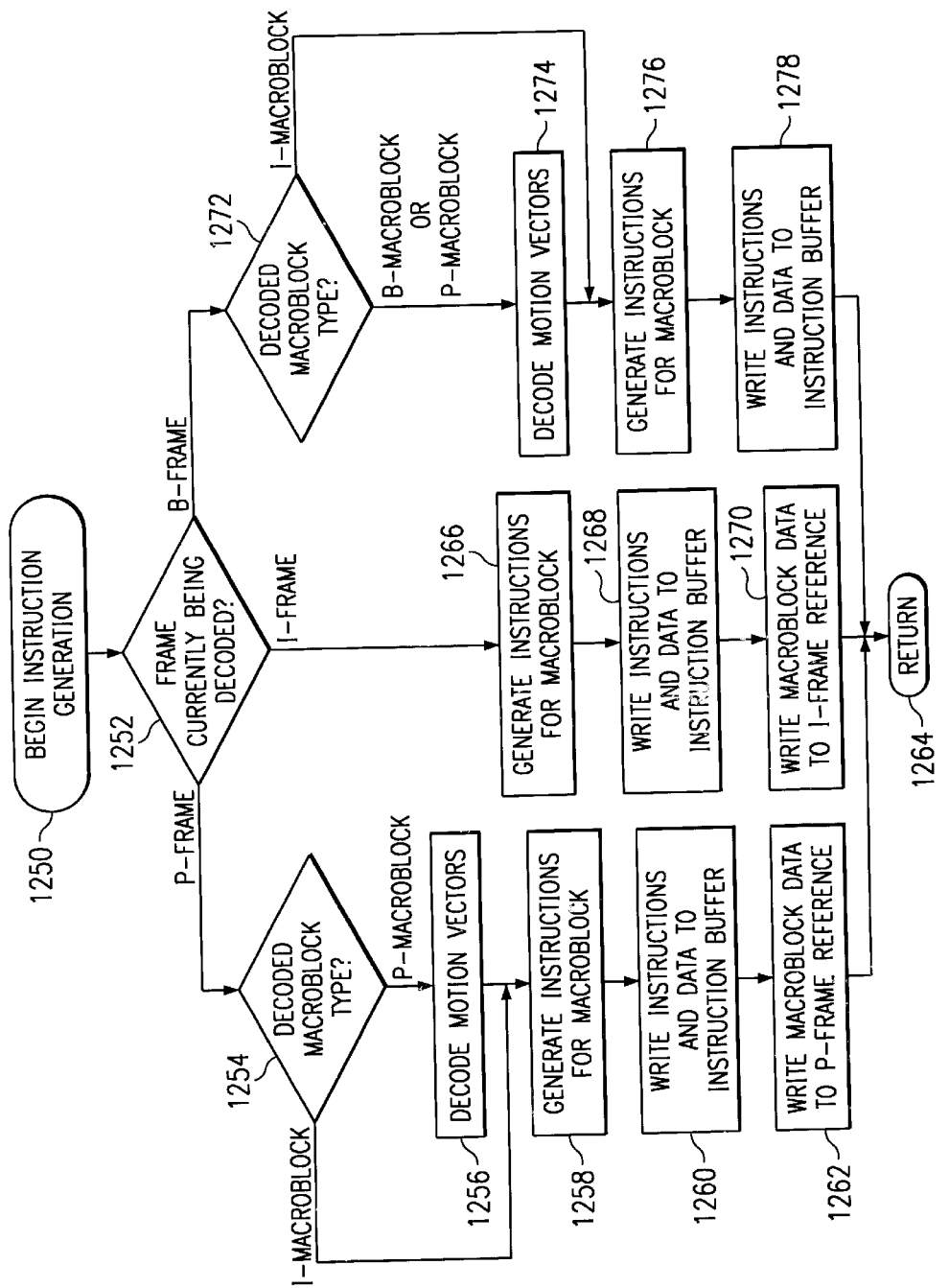

If an instruction driven motion compensation engine is detected or the decoded output is selected to be in an instruction format, as determined in decision block 1228, the prediction information is processed using a generate instruction process in block 1230, which will be described in detail in reference to FIG. 15B. If, however, an instruction driven motion compensation engine is not detected or the decoded output is to be in a color space format, as determined in decision block 1228, the prediction information is processed using a motion compensation engine in block 1232, which will be described in detail in reference to FIG. 15C. The DCT information from block 1226 is processed using a block decode process in block 1234, which will be described in detail in reference to FIG. 15D. If an instruction driven motion compensation engine is not found or the decoded output is to be in a color space format, as determined in decision block 1236, the resulting predicted macroblock from block 1232 and the error terms from block 1234 are summed together in block 1238 to produce a decoded macroblock. Next, the decoded macroblock is written to the current display buffer in block 1240. If, however, an instruction driven motion compensation engine is detected or the decoded output is selected to be in a instruction format, as determined in decision block 1236, the error terms from block 1234 are written to the error buffer in block 1242. After blocks 1230, 1240 or 1242 are complete, processing loops back to decision block 1104 where a terminate signal is checked for.

Now referring to FIG. 15B, the instruction generation process of block 1230 will be described. Instruction generation begins in block 1250 and blocks 1252, 1254 and 1272 preform prediction mode determination. If a P frame is currently being decoded, as determined in decision block 1252 and the macroblock to be decoded is a P macroblock, as determined in decision block 1254, the motion vectors are decoded in block 1256. Once the motion vectors are decoded or if the macroblock to be decoded is an I macroblock, as determined in decision block 1254, the instructions for the macroblock are generated in block 1258 and the instructions and associated data is written to the instruction buffer in block 1260. Thereafter, the macroblock is written to the P frame reference buffer in block 1262 and processing returns in block 1264. If, however, an I frame is currently being decoded, as determined in decision block 1252, the instructions for the macroblock are generated in block 1266 and the instructions and associated data is written to the instruction buffer in block 1268. Thereafter, the macroblock is written to the I frame reference buffer in block 1270 and processing returns in block 1264. If, however, a B frame is currently being decoded, as determined in decision block 1252 and the macroblock to be decoded is a B macroblock or a P macroblock, as determined in decision block 1272, the motion vectors are decoded in block 1274. Once the motion vectors are decoded or if the macroblock to be decoded is an I macroblock, as determined in decision block 1272, the instructions for the macroblock are generated in block 1276 and the instructions and associated data is written to the instruction buffer in block 1278. Thereafter, processing returns in block 1264.

Figure 15C:
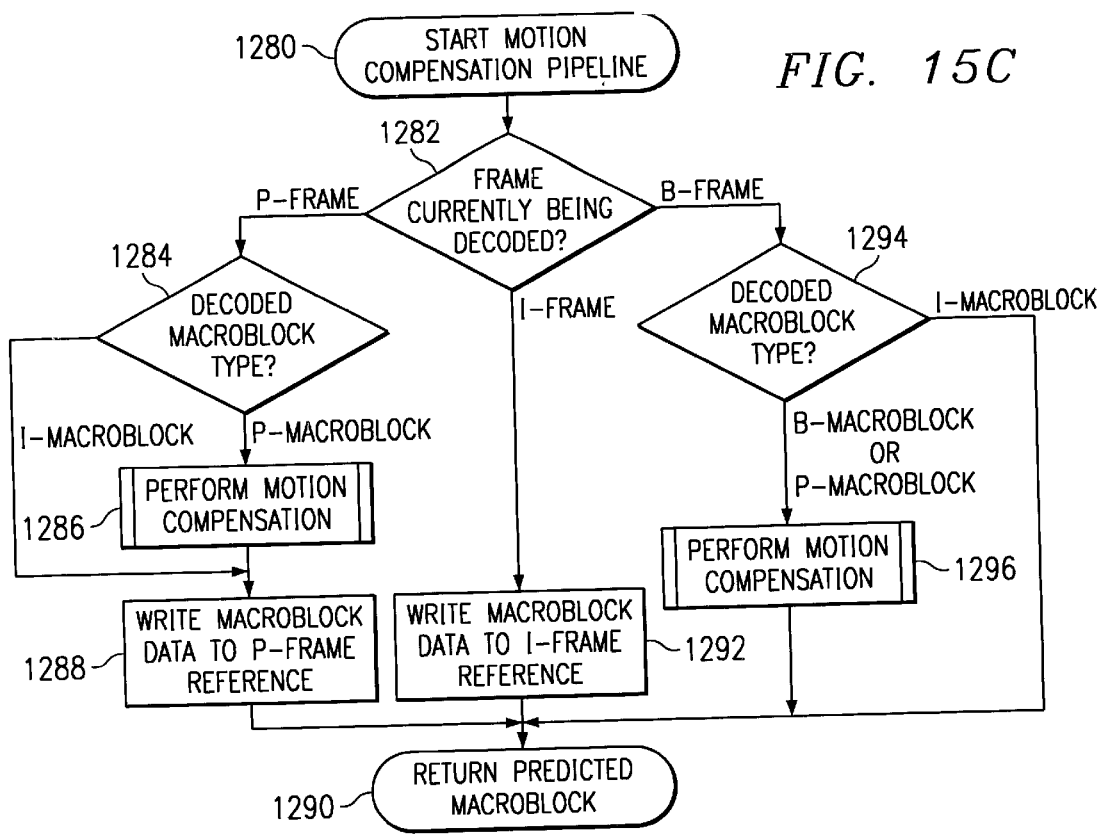

Now referring to FIG. 15C, the motion compensation pipeline of block 1232 will be described. Motion compensation begins in block 1280 and blocks 1282, 1284 and 1294 preform prediction mode determination. If a P frame is currently being decoded, as determined in decision block 1282 and the macroblock to be decoded is a P macroblock, as determined in decision block 1284, motion compensation is performed on the macroblock in block 1286, which will be described in detail below in reference to FIG. 15E. Once the motion compensation of block 1286 is complete or the macroblock to be decoded is an I macroblock, as determined in decision block 1284, the macroblock is written to the P frame reference buffer in block 1288 and the predicted macroblock is returned in block 1290. If, however, an I frame is currently being decoded, as determined in decision block 1282, the macroblock is written to the I frame reference buffer in block 1292 and the macroblock is returned as a predicted macroblock in block 1290. If, however, a B frame is currently being decoded, as determined in decision block 1282 and the macroblock to be decoded is a B macroblock or a P macroblock, as determined in decision block 1294, motion compensation is performed on the macroblock in block 1296, which will be described in detail below in reference to FIG. 15E. Once the motion compensation of block 1296 is complete or the macroblock to be decoded is an I macroblock, as determined in decision block 1294, the predicted macroblock is returned in block 1290.

Figure 15D:
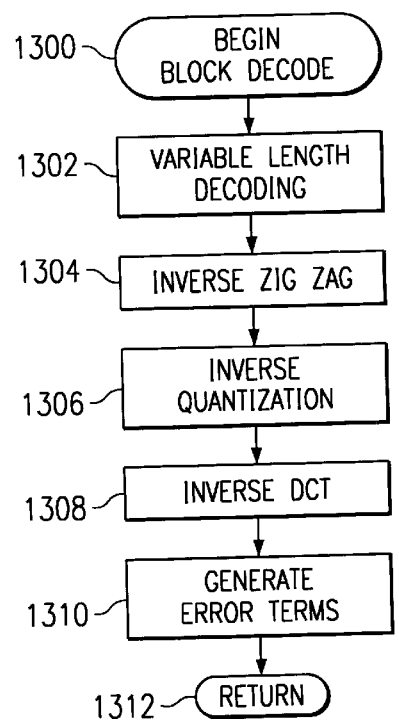

Now referring to FIG. 15D, the block decode process 1234 will be described. Block decoding begins in block 1300 and variable length decoding is performed in block 1302. An inverse zig-zag function is performed in block 1304 followed by an inverse quantization in block 1306 and an inverse DCT function in block 1308. The error terms are then generated in block 1310 and are returned in block 1312.

Figure 15E:
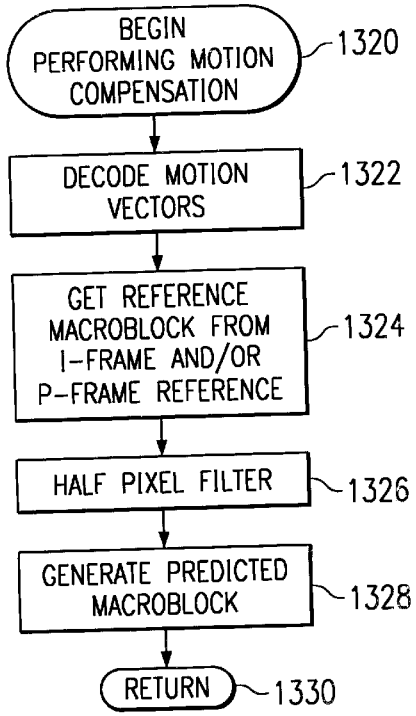

Now referring to FIG. 15E, the motion compensation process of blocks 1286 and 1296 will be described. Motion compensation begins in block 1320 and the motion vectors are decoded in block 1322. Next, the required macroblock to perform the motion compensation is retrieved from the I frame and/or P frame reference buffer as required in block 1324. The retrieved macroblock is then passed through a half pixel filter in block 1326 and the predicted macroblock is generated in block 1328. Thereafter, the predicted macroblock is returned in block 1330.

Figure 16A:
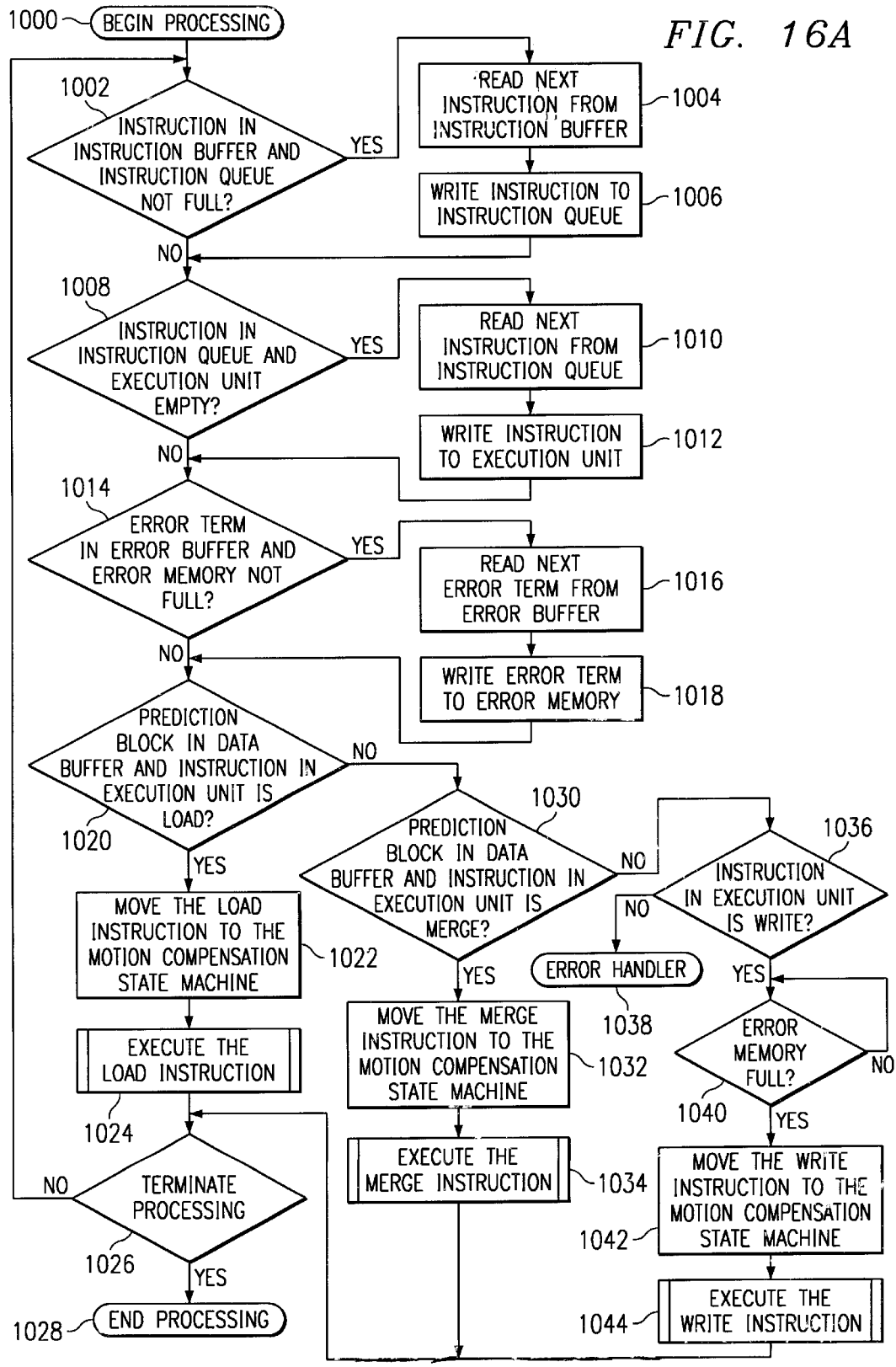
FIG. 16A is a flowchart depicting the steps for driving a motion compensation engine in accordance with one embodiment of the present invention.

Turning now to FIGS. 11, 12 and 16A, the steps for driving a motion compensation engine in accordance with one embodiment of the present invention will be described. Processing begins in block 1000 and decision block 1002 determines whether there is an instruction in the instruction buffer 612*b* and the instruction queue 618 is not full. If there is an instruction in the instruction buffer 612*b* and the instruction queue 618 is not full, the next instruction is read from the instruction buffer 612*b* in block 1004 and the instruction is written to the instruction queue 618 in block 1006. If, however, there is not an instruction in the instruction buffer 612*b* or the instruction queue 618 is full, as determined in decision block 1006, or the instruction has just been written to the instruction queue in block 1006, decision block 1008 determines whether there is an instruction in the instruction queue 618 and the execution unit 616 is empty. If there is an instruction in the instruction queue 618 and the execution unit 616 is empty, the next instruction is read from the instruction buffer 612*b* in block 1010 and the instruction is written to the execution unit 616 in block 1012. If, however, there is not an instruction in the instruction queue 618 or the execution unit 616 is not empty, as determined in decision block 1008, or the instruction has just been written to the execution unit in block 1012, decision block decision block 1014 determines whether there is an error term in the error buffer 612a and the error memory 613 is not full. If there is an error term in the error buffer 612a and the error memory 613 is not full, the next error term is read from the error buffer 612a in block 1016 and the error term is written to the error memory 613 in block 1006. If, however, there is not an error term in the error buffer 612a or the error memory 613 is full, as determined in decision block 1014, or the error term has just been written to the error memory 613 in block 1018, decision block 1020 determines whether there is a prediction block in data buffer 612c and the instruction in the execution unit 616 is a load instruction.

If there is a prediction block in data buffer 612c and the instruction in the execution unit 616 is a load instruction, the load instruction is moved to the motion compensation state machine 614 in block 1022 and the load instruction is executed in block 1024. The processing steps associated with the load instruction will be described in detail below in reference to FIG. 16B. Decision block 1026 determines whether the process should be terminated. If the process should be terminated, processing ends in block 1028. If, however, the process should not be terminated, as determined in decision block 1026, processing loops back to block 1002 where the instruction buffer 612b and the instruction queue 618 are checked. Decision block 1030 determines whether there is a prediction block in data buffer 612c and the instruction in the execution unit 616 is a merge instruction.

If there is a prediction block in data buffer 612c and the instruction in the execution unit 616 is a merge instruction, the merge instruction is moved to the motion compensation state machine 614 in block 1032 and the merge instruction is executed in block 1034. The processing steps associated with the merge instruction will be described in detail below in reference to FIG. 16C. Processing then proceeds as previously described to decision block 1026 to determine whether the process should be terminated. Decision block 1036 determines whether the instruction in the execution unit 616 is a write instruction.

If the instruction in the execution unit 616 is not a write instruction, an error has occurred because the instruction was not recognized and an error handler is called in block 1038. If, however, the instruction in the execution unit 616 is a write instruction, as determined in block 1036, decision block 1040 determines whether the error memory 613 is full. If the error memory 613 is not full, processing is suspended until the error memory 613 is full. When the error memory 613 is full, as determined in decision block 1040, the write instruction is moved to the motion compensation state machine 614 in block 1042 and the write instruction is executed in block 1044. The processing steps associated with the write instruction will be described in detail below in reference to FIG. 16D. Processing then proceeds as previously described to decision block 1026 to determine whether the process should be terminated.

Figure 16B:
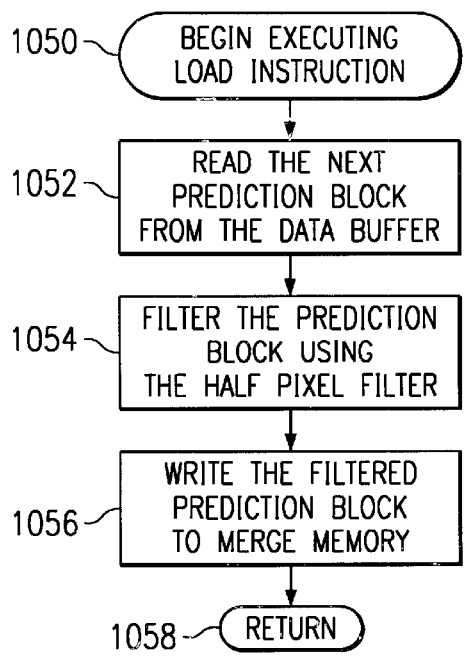
FIGS. 16B, 16C and 16D are flowcharts depicting the steps for executing a load instruction, a merge instruction and a write instruction in accordance with one embodiment of the present invention.

Turning now to FIGS. 11, 12 and 16B, the steps for executing a load instruction in accordance with one embodiment of the present invention will be described. Load instruction execution begins in block 1050. The next prediction block is read from data buffer 612c in block 1052 and is filtered using the half pixel filter 576 in step 1054. The filtered prediction block is then written to memory in block 1056 and processing returns to the main process in block 1058.

Figure 16C:
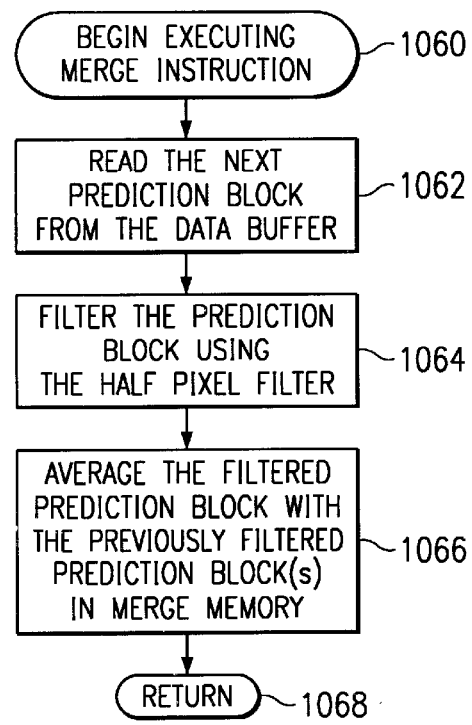

Turning now to FIGS. 11, 12 and 16C, the steps for executing a merge instruction in accordance with one embodiment of the present invention will be described. Merge instruction execution begins in block 1060. The next prediction block is read from data buffer 612c in block 1062 and is filtered using the half pixel filter 576 in step 1064. The filtered prediction block is then averaged with the previously filtered prediction blocks in merge memory 615 in block 1066 and processing returns to the main process in block 1068.

Figure 16D:
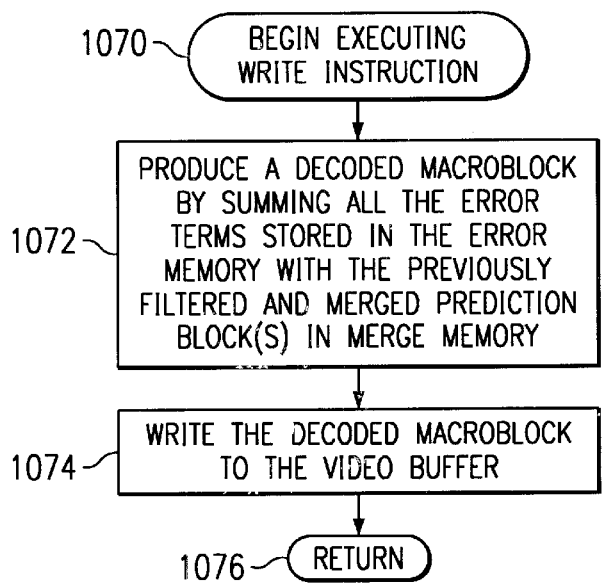

Turning now to FIGS. 11, 12 and 16D, the steps for executing a write instruction in accordance with one embodiment of the present invention will be described. Write instruction execution begins in block 1070. In block 1072, a decoded macroblock is produced in the sum unit 590 by algebraic summing all the error terms stored in the error memory 613 with the previously filtered and merged prediction blocks in merge memory 615. The decoded macroblock is then written to the video buffer 628 and processing returns to the main process in block 1076.

Figure 17:
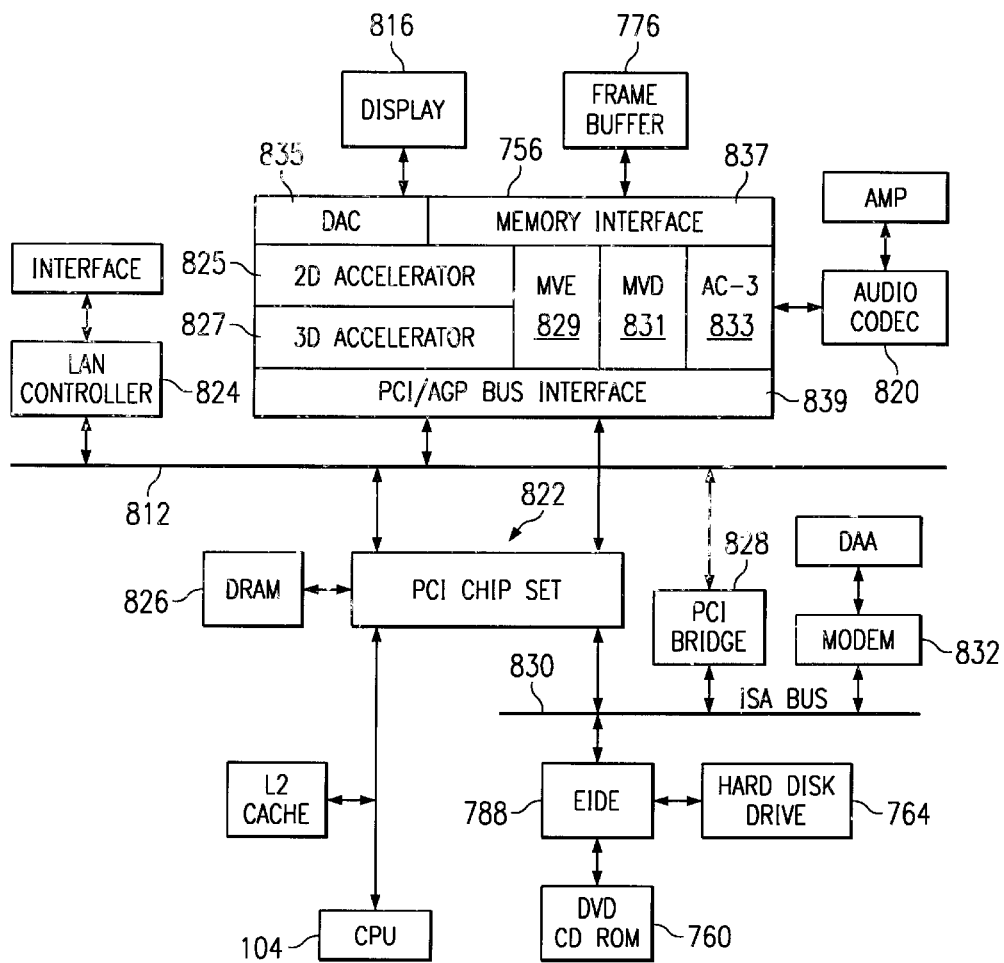
FIG. 17 depicts a computer where the video decoder and audio decoder are sharing a frame buffer with a graphics accelerator.

Turning now to FIG. 17, a computer is depicted where the video decoder, sub-picture decoder and audio decoder are sharing a frame buffer 776 with a graphics accelerator 756. The graphics accelerator 756 can be any graphics accelerator known in the art. The graphics accelerator 756 contains a 2D accelerator 825, a 3D accelerator 827, a digital to analog converter 835, a memory interface 837, and bus interfaces 839 for any system busses 812 to which it is coupled. The graphics accelerator 756 can also contain an audio compressor/decompressor 833. The graphics accelerator 756 is coupled to a display 816, and a frame buffer 776.

In this embodiment, the frame buffer 776 is the memory to which the memory interface 837 is coupled. The frame buffer 776 is coupled to the memory interfaces 837 through a memory bus. In current technology the memory bus 812, for coupling a graphics accelerator to a memory, is capable of having a bandwidth of up to 400 Mbytes/s. This bandwidth is more than twice the bandwidth required for an optimized decoder/encoder 829 and 831. This allows the decoder/encoder 829 and 831 to operate in real time.

What is claimed is:

1. A digital video processor comprising:

an error memory and a merge memory;

a half pixel filter communicably coupled to the merge memory;

a controller communicably coupled to the error memory, the merge memory and the half pixel filter, the controller executing one or more instructions to provide motion compensation during video decoding; and a sum unit communicably coupled to the error memory and the merge memory.

2. The digital video processor as recited in claim 1, wherein the half pixel filter is programmable.

3. The digital video processor as recited in claim 1, wherein the error memory and the merge memory are random access memory.

4. The digital video processor as recited in claim 1, further comprising:

an error buffer communicably coupled to the error memory;

an instruction buffer communicably coupled to the controller;

a reference buffer communicably coupled to the half pixel filter; and a display buffer communicably coupled to the sum unit.

5. The digital video processor as recited in claim 4, wherein the error buffer, the instruction buffer, the reference buffer and the display buffer are random access memory.

6. The digital video processor as recited in claim 1, wherein the one or more instructions includes at least one of a load instruction, a merge instruction and a write instruction.

7. The digital video processor as recited in claim 1, wherein the controller further comprises:
   an instruction queue;
   an execution unit communicably connected to the instruction queue and the error memory; and
   a motion compensation state machine communicably connected to the execution unit, the half pixel filter and the merge memory.

8. The digital video processor as recited in claim 1, wherein the sum unit utilizes at least one or more error terms stored in the error memory with one or more filtered prediction blocks stored in the merge memory to produce a decoded macroblock.

9. The digital video processor as recited in claim 1, wherein the half pixel filter performs vertical and horizontal half-pixel interpolation on a block as dictated by a motion vector.

10. A digital video processor comprising:
    an error memory configured to store one or more error terms;
    a merge memory configured to store one or more filtered prediction blocks;
    a filter communicably coupled to the merge memory, the filter configured to perform vertical and horizontal half-pixel interpolation on a block as dictated by a motion vector;
    an instruction queue configured to store one or more instructions;
    an execution unit communicably coupled to the instruction queue and the error memory, the execution unit configured to receive an instruction from the instruction queue, determine whether the error memory is full and send the instruction to a motion compensation state machine for execution;
    the motion compensation state machine communicably coupled to the execution unit, the filter and the merge memory, the motion compensation state machine configured to execute the instruction received from the execution unit; and
    a sum unit communicably coupled to the error memory and the merge memory, the sum unit utilizes at least one or more error terms stored in the error memory with one or more filtered prediction blocks stored in the merge memory to produce a decoded macroblock.

11. The digital video processor as recited in claim 10, wherein the filter and the motion compensation state machine are programmable.

12. The digital video processor as recited in claim 10, further comprising:
    an error buffer communicably coupled to the error memory;
    an instruction buffer communicably coupled to the controller;
    a reference buffer communicably coupled to the half pixel filter; and
    a display buffer communicably coupled to the sum unit.

13. The digital video processor as recited in claim 10, wherein the motion compensation state machine is further configured to execute a load instruction, a merge instruction or a write instruction.

14. A digital video processor comprising:
    an error buffer;
    an error memory communicably coupled to the error buffer, the error memory configured to receive and store one or more error terms from the error buffer;
    an instruction buffer;
    an instruction queue communicably coupled to the instruction buffer, the instruction queue configured to receive and store one or more instructions from the instruction buffer;
    merge memory configured to receive and store one or more filtered prediction blocks;
    a reference buffer;
    a half pixel filter communicably coupled to the reference buffer and the merge memory, the half pixel filter performing vertical and horizontal half-pixel interpolation on a prediction block received from the reference buffer as dictated by a motion vector to produce a filtered prediction block, and writing the filtered prediction block to the merge memory;
    an execution unit communicably coupled to the instruction queue and the error memory, the execution unit configured to receive an instruction from the instruction queue, determine whether the error memory is full and send the instruction to a motion compensation state machine for execution;
    the motion compensation state machine communicably coupled to the execution unit, the half pixel filter and the merge memory, the motion compensation state machine configured to execute the instruction received from the execution unit; and
    a sum unit communicably coupled to the error memory and the merge memory, the sum unit utilizing at least one or more error terms stored in the error memory and one or more filtered prediction blocks stored in the merge memory to produce a decoded macroblock, and to write the decoded macroblock to an display buffer.

15. The digital video processor as recited in claim 14, wherein the half pixel filter and the motion compensation state machine are programmable.

* * * * *